(12) United States Patent
Chang et al.

(10) Patent No.: US 8,916,281 B2
(45) Date of Patent: Dec. 23, 2014

(54) REBALANCING ELECTROLYTES IN REDOX FLOW BATTERY SYSTEMS

(75) Inventors: On Kok Chang, San Jose, CA (US); Ai Quoc Pham, Milpitas, CA (US)

(73) Assignee: Enervault Corporation, Sunnyvale, CA (US)

( * ) Notice: Subject to any disclaimer, the term of this patent is extended or adjusted under 35 U.S.C. 154(b) by 0 days.

(21) Appl. No.: 13/433,189

(22) Filed: Mar. 28, 2012

(65) Prior Publication Data

US 2013/0084482 A1   Apr. 4, 2013

Related U.S. Application Data

(60) Provisional application No. 61/468,738, filed on Mar. 29, 2011.

(51) Int. Cl.
| | |
|---|---|
| *H01M 4/36* | (2006.01) |
| *H01M 4/48* | (2010.01) |
| *H01M 6/20* | (2006.01) |
| *H01M 10/42* | (2006.01) |
| *H01M 8/18* | (2006.01) |

(52) U.S. Cl.
CPC .......... *H01M 10/4242* (2013.01); *H01M 8/188* (2013.01); *Y02E 60/528* (2013.01)
USPC .............................. 429/107; 429/101; 429/59

(58) Field of Classification Search
USPC ........................................... 429/101–109, 51
See application file for complete search history.

(56) References Cited

U.S. PATENT DOCUMENTS

| | | | |
|---|---|---|---|
| 2,946,836 A | 7/1960 | Justi et al. | |
| 3,540,934 A | 11/1970 | Boeke | 136/86 |
| 3,934,624 A | 1/1976 | Eberle | 141/100 |
| 3,996,064 A | 12/1976 | Thaller | 320/2 |
| 3,999,581 A | 12/1976 | Eberle | 141/1 |
| 4,010,780 A | 3/1977 | Eberle | 141/168 |
| 4,018,971 A | 4/1977 | Sheibley et al. | 429/105 |
| 4,062,807 A | 12/1977 | Suzuki | 252/443 |

(Continued)

FOREIGN PATENT DOCUMENTS

| | | |
|---|---|---|
| CN | 101213700 A | 7/2008 |
| JP | 57-9072 A | 1/1982 |

(Continued)

OTHER PUBLICATIONS

L. W. Hruska and R. F. Savinell, "Investigation of Factors Affecting Performance of the Iron-Redox Battery" Jan. 1981, J. Electrochem. Soc. vol. 128, Issue 1, pp. 18-25.*

(Continued)

*Primary Examiner* — Ula C. Ruddock
*Assistant Examiner* — Osei Amponsah
(74) *Attorney, Agent, or Firm* — The Marbury Law Group, PLLC

(57) ABSTRACT

Embodiments of redox flow battery rebalancing systems include a system for reacting an unbalanced flow battery electrolyte with a rebalance electrolyte in a first reaction cell. In some embodiments, the rebalance electrolyte may contain ferrous iron ($Fe^{2+}$) which may be oxidized to ferric iron ($Fe^{3+}$) in the first reaction cell. The reducing ability of the rebalance reactant may be restored in a second rebalance cell that is configured to reduce the ferric iron in the rebalance electrolyte back into ferrous iron through a reaction with metallic iron.

10 Claims, 6 Drawing Sheets

(56) References Cited

U.S. PATENT DOCUMENTS

| | | | | |
|---|---|---|---|---|
| 4,071,660 | A | 1/1978 | Hart | 429/15 |
| 4,117,204 | A | 9/1978 | Zito, Jr. | 429/19 |
| 4,133,941 | A | 1/1979 | Sheibley | 429/33 |
| 4,147,843 | A | 4/1979 | Hakkinen | 429/109 |
| 4,159,366 | A | 6/1979 | Thaller | 429/15 |
| 4,162,351 | A | 7/1979 | Putt et al. | 429/15 |
| 4,192,910 | A | 3/1980 | Giner et al. | 429/101 |
| 4,200,684 | A | 4/1980 | Bro | 429/51 |
| 4,264,686 | A | 4/1981 | Frank | 429/44 |
| 4,270,984 | A | 6/1981 | Giner et al. | 204/2.1 |
| 4,307,159 | A | 12/1981 | Hammond et al. | |
| 4,309,372 | A | 1/1982 | Sheibley | 264/45.3 |
| 4,362,791 | A | 12/1982 | Kaneko et al. | |
| 4,370,392 | A | 1/1983 | Savinell et al. | 429/15 |
| 4,377,623 | A | 3/1983 | Parker et al. | |
| 4,382,116 | A | 5/1983 | Gahn et al. | 429/34 |
| 4,399,200 | A | 8/1983 | Galloway | 429/23 |
| 4,407,902 | A | 10/1983 | Kummer et al. | 429/15 |
| 4,414,090 | A * | 11/1983 | D'Agostino et al. | 204/252 |
| 4,454,649 | A | 6/1984 | Jalan et al. | 29/623.5 |
| 4,468,441 | A | 8/1984 | D'Agostino et al. | 429/105 |
| 4,469,760 | A | 9/1984 | Giner et al. | 429/21 |
| 4,485,154 | A | 11/1984 | Remick et al. | 429/14 |
| 4,492,741 | A | 1/1985 | Struthers | 429/34 |
| 4,496,637 | A | 1/1985 | Shimada et al. | 429/44 |
| 4,543,302 | A | 9/1985 | Gahn et al. | |
| 4,576,878 | A | 3/1986 | Gahn | |
| 4,578,323 | A | 3/1986 | Hertl et al. | 429/15 |
| 4,615,108 | A | 10/1986 | Tomazic | 29/623.2 |
| 4,650,732 | A | 3/1987 | Weber | 429/120 |
| 4,652,501 | A | 3/1987 | Bennetto et al. | 429/2 |
| 4,711,828 | A | 12/1987 | Ishida et al. | 429/12 |
| 4,714,663 | A | 12/1987 | Arnold, Jr. et al. | 429/101 |
| 4,732,827 | A | 3/1988 | Kaneko et al. | |
| 4,784,924 | A | 11/1988 | Savinell et al. | 429/15 |
| 4,786,567 | A | 11/1988 | Skyllas-Kazacos et al. | |
| 4,797,566 | A | 1/1989 | Nozaki et al. | 307/43 |
| 4,814,241 | A | 3/1989 | Nagashima et al. | |
| 4,874,483 | A | 10/1989 | Wakabayashi et al. | |
| 4,882,241 | A | 11/1989 | Heinzel | 429/19 |
| 4,945,019 | A | 7/1990 | Bowen et al. | 429/72 |
| 4,956,244 | A | 9/1990 | Shimizu et al. | |
| 5,061,578 | A | 10/1991 | Kozuma et al. | 429/3 |
| 5,135,820 | A | 8/1992 | Jones | |
| 5,162,168 | A | 11/1992 | Downing et al. | 429/51 |
| 5,188,911 | A | 2/1993 | Downing et al. | 429/70 |
| 5,250,158 | A | 10/1993 | Kaneko et al. | |
| 5,258,241 | A * | 11/1993 | Ledjeff et al. | 429/498 |
| 5,308,718 | A | 5/1994 | Eidler et al. | 429/152 |
| 5,316,643 | A | 5/1994 | Ahn et al. | 204/265 |
| 5,318,865 | A | 6/1994 | Kaneko et al. | 429/193 |
| 5,366,824 | A | 11/1994 | Nozaki et al. | 429/34 |
| 5,368,762 | A | 11/1994 | Magome et al. | |
| 5,391,973 | A | 2/1995 | Tomazic | 320/21 |
| 5,436,087 | A | 7/1995 | Tomazic | 429/50 |
| 5,445,905 | A | 8/1995 | Marsh et al. | 429/105 |
| 5,459,390 | A | 10/1995 | Tomazic | 320/30 |
| 5,587,132 | A | 12/1996 | Nakajima et al. | |
| 5,601,943 | A | 2/1997 | Eidler et al. | 429/163 |
| 5,605,771 | A | 2/1997 | Eidler et al. | 429/72 |
| 5,607,788 | A | 3/1997 | Tomazic | 429/72 |
| 5,610,802 | A | 3/1997 | Eidler et al. | 361/831 |
| 5,612,148 | A | 3/1997 | Zito | |
| 5,626,986 | A | 5/1997 | Jahns et al. | 429/210 |
| 5,650,239 | A | 7/1997 | Lex et al. | 429/49 |
| 5,656,390 | A | 8/1997 | Kageyama et al. | 429/44 |
| 5,665,212 | A | 9/1997 | Zhong et al. | 304/297 R |
| 5,702,842 | A | 12/1997 | Tomazic | 429/105 |
| 5,716,733 | A | 2/1998 | Tomazic | 429/130 |
| 5,759,711 | A | 6/1998 | Miyabayashi et al. | 429/15 |
| 5,798,180 | A | 8/1998 | Chowdhury et al. | 428/411.1 |
| 5,804,329 | A | 9/1998 | Amendola | 429/34 |
| 5,851,694 | A | 12/1998 | Miyabayashi et al. | 429/105 |
| 5,910,366 | A | 6/1999 | Chowdhury et al. | 428/379 |
| 6,005,183 | A | 12/1999 | Akai et al. | 136/244 |
| 6,040,075 | A | 3/2000 | Adcock et al. | 429/32 |
| 6,086,643 | A | 7/2000 | Clark et al. | 29/623.2 |
| 6,096,179 | A | 8/2000 | Fajt et al. | 204/294 |
| 6,143,443 | A | 11/2000 | Kazacos et al. | |
| 6,242,125 | B1 | 6/2001 | Eidler et al. | 429/51 |
| 6,261,714 | B1 | 7/2001 | Eidler et al. | 429/70 |
| 6,455,187 | B1 | 9/2002 | Tomazic | |
| 6,461,772 | B1 | 10/2002 | Miyake et al. | 429/247 |
| 6,468,688 | B2 | 10/2002 | Kazacos et al. | |
| 6,475,661 | B1 | 11/2002 | Pellegri et al. | 429/105 |
| 6,497,973 | B1 | 12/2002 | Amendola | 429/19 |
| 6,509,119 | B1 | 1/2003 | Kobayashi et al. | 429/231.8 |
| 6,555,267 | B1 | 4/2003 | Broman et al. | 429/210 |
| 6,558,833 | B2 | 5/2003 | McCoy | 429/70 |
| 6,562,514 | B1 | 5/2003 | Kazacos et al. | 429/204 |
| 6,613,298 | B2 | 9/2003 | Tanaka et al. | |
| 6,624,383 | B1 | 9/2003 | Lichtenstein et al. | 219/121.69 |
| 6,652,819 | B2 | 11/2003 | Shiroto et al. | |
| 6,692,862 | B1 | 2/2004 | Zocchi | 429/50 |
| 6,711,036 | B2 | 3/2004 | Winter | 363/65 |
| 6,759,158 | B2 | 7/2004 | Tomazic | 429/61 |
| 6,761,945 | B1 | 7/2004 | Adachi et al. | 428/36.1 |
| 6,764,663 | B2 | 7/2004 | Monaghan et al. | |
| 6,764,789 | B1 | 7/2004 | Sekiguchi et al. | |
| 6,812,171 | B2 | 11/2004 | Shimazaki et al. | 442/337 |
| 6,864,012 | B2 | 3/2005 | Tomazic | |
| 6,872,376 | B2 | 3/2005 | Tanaka et al. | |
| 6,905,797 | B2 | 6/2005 | Broman et al. | 429/235 |
| 6,986,966 | B2 | 1/2006 | Clarke et al. | |
| 7,046,531 | B2 | 5/2006 | Zocchi et al. | 363/65 |
| 7,060,738 | B2 | 6/2006 | Jing et al. | 522/187 |
| 7,060,756 | B2 | 6/2006 | Jing et al. | 525/327.4 |
| 7,061,205 | B2 | 6/2006 | Shigematsu et al. | 320/101 |
| 7,071,271 | B2 | 7/2006 | Thaler et al. | 526/243 |
| 7,078,123 | B2 | 7/2006 | Kazacos et al. | |
| 7,112,614 | B2 | 9/2006 | Jing et al. | 521/27 |
| 7,156,972 | B2 | 1/2007 | Diel et al. | |
| 7,173,067 | B2 | 2/2007 | Guerra | 521/31 |
| 7,181,183 | B1 | 2/2007 | Hennessy | 455/289 |
| 7,184,903 | B1 | 2/2007 | Williams et al. | 702/60 |
| 7,199,550 | B2 | 4/2007 | Tsutsui et al. | 320/101 |
| 7,220,515 | B2 | 5/2007 | Ito et al. | 429/72 |
| 7,227,275 | B2 | 6/2007 | Hannessy et al. | 290/55 |
| 7,258,947 | B2 | 8/2007 | Kubata et al. | |
| 7,259,208 | B2 | 8/2007 | Guerra et al. | 525/178 |
| 7,265,162 | B2 | 9/2007 | Yandrasits et al. | 522/156 |
| 7,265,456 | B2 | 9/2007 | Hennessy | 290/44 |
| 7,270,911 | B2 | 9/2007 | Clarke et al. | 429/105 |
| 7,297,437 | B2 | 11/2007 | Clarke et al. | |
| 7,309,540 | B2 | 12/2007 | Wang | 429/33 |
| 7,314,761 | B2 | 1/2008 | Winter | 436/151 |
| 7,320,844 | B2 | 1/2008 | Skyllas-Kazacos | 429/105 |
| 7,326,737 | B2 | 2/2008 | Guerra | 521/31 |
| 7,332,065 | B2 | 2/2008 | Shimamune | 204/290.13 |
| 7,353,083 | B2 | 4/2008 | Hennessy | 700/286 |
| 7,389,189 | B2 | 6/2008 | Williams et al. | 702/60 |
| 7,411,022 | B2 | 8/2008 | Guerra et al. | 525/178 |
| 7,465,507 | B2 * | 12/2008 | DeVries | 429/404 |
| 7,517,608 | B2 | 4/2009 | Brereton et al. | 429/71 |
| 7,537,859 | B2 | 5/2009 | Samuel et al. | 429/101 |
| 7,554,220 | B2 | 6/2009 | Sugawara | 307/64 |
| 7,557,531 | B2 | 7/2009 | Willets et al. | 320/101 |
| 7,670,719 | B2 | 3/2010 | Nakaishi et al. | 429/163 |
| 7,682,728 | B2 | 3/2010 | Harper | 429/101 |
| 7,687,193 | B2 | 3/2010 | Harper | 429/101 |
| 7,704,634 | B2 | 4/2010 | Deguchi et al. | 429/105 |
| 7,740,977 | B2 | 6/2010 | Lepp et al. | 429/72 |
| 7,820,321 | B2 | 10/2010 | Horne et al. | 429/149 |
| 7,855,005 | B2 | 12/2010 | Sahu | 429/51 |
| 7,919,204 | B2 | 4/2011 | Sahu | 429/105 |
| 7,923,965 | B2 | 4/2011 | Ritter et al. | 320/127 |
| 7,927,731 | B2 | 4/2011 | Sahu | 429/101 |
| 7,939,190 | B2 | 5/2011 | Colello et al. | 429/61 |
| 7,976,974 | B2 | 7/2011 | Kazacos et al. | 429/105 |
| 7,993,932 | B2 | 8/2011 | Winter | 436/151 |
| 8,008,808 | B2 | 8/2011 | Seeker et al. | 307/72 |
| 8,029,944 | B2 | 10/2011 | Yau et al. | 429/523 |
| 8,039,161 | B2 | 10/2011 | Winter | 429/447 |
| 8,048,555 | B2 | 11/2011 | Darcy et al. | 429/122 |

(56) References Cited

U.S. PATENT DOCUMENTS

| | | | |
|---|---|---|---|
| 8,137,830 B2 | 3/2012 | Whitacre | 429/50 |
| 8,137,831 B1 | 3/2012 | La O' et al. | 429/51 |
| 8,168,337 B2 | 5/2012 | Friesen et al. | 429/402 |
| 8,182,940 B2 | 5/2012 | Ridley | 429/210 |
| 8,202,641 B2 | 6/2012 | Winter et al. | 429/80 |
| 8,221,911 B2 | 7/2012 | Kumamoto et al. | 429/51 |
| 8,222,043 B2 | 7/2012 | Winter | 436/151 |
| 8,338,008 B2 | 12/2012 | Zu et al. | |
| 8,394,529 B2 | 3/2013 | Keshavarz et al. | |
| 8,491,763 B2 | 7/2013 | Friesen | |
| 8,541,121 B2 | 9/2013 | Keshavarz et al. | |
| 8,668,997 B2 | 3/2014 | Zaffou et al. | |
| 2001/0055713 A1 | 12/2001 | Eidler et al. | 429/81 |
| 2003/0007370 A1 | 1/2003 | Winter | 363/37 |
| 2003/0008204 A1 | 1/2003 | Winter et al. | 429/81 |
| 2003/0113615 A1 | 6/2003 | Tomazic | |
| 2003/0143456 A1 | 7/2003 | Kazacos et al. | 429/31 |
| 2003/0165741 A1 | 9/2003 | Maly-Schreiber et al. | 429/235 |
| 2004/0070370 A1 | 4/2004 | Emura | 320/128 |
| 2004/0121204 A1 | 6/2004 | Adelman et al. | |
| 2004/0170893 A1 | 9/2004 | Nakaishi et al. | 429/185 |
| 2004/0202915 A1 | 10/2004 | Nakaishi et al. | 429/34 |
| 2004/0241544 A1 | 12/2004 | Nakaishi et al. | 429/210 |
| 2004/0241552 A1 | 12/2004 | Skyllas-Kazacos | |
| 2005/0074653 A1 | 4/2005 | Broman et al. | 429/33 |
| 2005/0074665 A1 | 4/2005 | Spaziante et al. | 429/50 |
| 2005/0118494 A1 | 6/2005 | Choi | |
| 2005/0158614 A1 | 7/2005 | Hennessy | 429/61 |
| 2005/0158615 A1 | 7/2005 | Samuel et al. | 429/81 |
| 2005/0164075 A1 | 7/2005 | Kumamoto et al. | 429/50 |
| 2005/0244707 A1 | 11/2005 | Skyllas-Kazacos et al. | 429/105 |
| 2005/0287436 A1 | 12/2005 | Kawashige et al. | |
| 2006/0063065 A1 | 3/2006 | Clarke et al. | |
| 2006/0183016 A1 | 8/2006 | Kazacos et al. | 429/105 |
| 2007/0021300 A1 | 1/2007 | Farant | 502/430 |
| 2007/0035135 A1 | 2/2007 | Yoshida | 290/44 |
| 2007/0072067 A1 | 3/2007 | Symons et al. | 429/101 |
| 2007/0246352 A1 | 10/2007 | Keister | 204/278.5 |
| 2008/0193828 A1 | 8/2008 | Sahu | |
| 2008/0292964 A1 | 11/2008 | Kazacos et al. | 429/231.5 |
| 2008/0299439 A1 | 12/2008 | Wang | 429/34 |
| 2009/0017379 A1 | 1/2009 | Inatomi et al. | |
| 2009/0110998 A1 | 4/2009 | Miyachi et al. | 429/33 |
| 2009/0130525 A1 | 5/2009 | Miyachi et al. | 429/33 |
| 2009/0197151 A1 | 8/2009 | Kumamoto et al. | 429/51 |
| 2009/0208807 A1 | 8/2009 | Miyachi et al. | 429/33 |
| 2009/0212262 A1 | 8/2009 | Elson et al. | 252/500 |
| 2009/0225573 A1 | 9/2009 | Sugawara | 363/56.01 |
| 2009/0253025 A1 | 10/2009 | Whitacre | 429/50 |
| 2009/0295162 A1 | 12/2009 | Oohara et al. | 290/44 |
| 2010/0003545 A1 | 1/2010 | Horne et al. | 429/12 |
| 2010/0047671 A1 | 2/2010 | Chiang et al. | 429/50 |
| 2010/0086829 A1 | 4/2010 | Ridley | 429/36 |
| 2010/0089480 A1 | 4/2010 | Sahu et al. | 138/121 |
| 2010/0090651 A1 | 4/2010 | Sahu et al. | 320/132 |
| 2010/0092757 A1 | 4/2010 | Nair et al. | 428/306.6 |
| 2010/0092807 A1 | 4/2010 | Sahu et al. | 429/10 |
| 2010/0092843 A1 | 4/2010 | Conway | |
| 2010/0094468 A1 | 4/2010 | Sahu et al. | 700/281 |
| 2010/0112391 A1 | 5/2010 | Salloum et al. | 429/14 |
| 2010/0119895 A1 | 5/2010 | Friesen | 429/17 |
| 2010/0119937 A1 | 5/2010 | Winter | 429/185 |
| 2010/0136455 A1 | 6/2010 | Winter | 429/458 |
| 2010/0143781 A1 | 6/2010 | Keshavarz et al. | |
| 2010/0178533 A1 | 7/2010 | Whitehead et al. | 429/7 |
| 2010/0188045 A1 | 7/2010 | Colello et al. | 320/118 |
| 2010/0216006 A1 | 8/2010 | Rennebeck | 429/105 |
| 2010/0243459 A1 | 9/2010 | Friesen et al. | 205/50 |
| 2010/0261070 A1 | 10/2010 | Keshavarz et al. | |
| 2010/0285375 A1 | 11/2010 | Friesen et al. | 429/405 |
| 2010/0316935 A1 | 12/2010 | Friesen et al. | 429/512 |
| 2010/0323264 A1 | 12/2010 | Chiang et al. | 429/449 |
| 2010/0330437 A1 | 12/2010 | Burchardt et al. | 429/406 |
| 2011/0014527 A1 | 1/2011 | Ohlsen | 429/408 |
| 2011/0045332 A1 | 2/2011 | Horne et al. | 429/105 |
| 2011/0052945 A1 | 3/2011 | Whitacre | 429/50 |
| 2011/0070483 A1 | 3/2011 | Keshavarz et al. | 429/188 |
| 2011/0070506 A1 | 3/2011 | Friesen et al. | 429/404 |
| 2011/0074357 A1 | 3/2011 | Parakulam et al. | 320/134 |
| 2011/0076526 A1 | 3/2011 | Zu et al. | 429/51 |
| 2011/0079074 A1 | 4/2011 | Sahu | 73/25.03 |
| 2011/0080143 A1 | 4/2011 | Parakulam et al. | 320/162 |
| 2011/0081561 A1 | 4/2011 | Keshavarz et al. | |
| 2011/0081562 A1 | 4/2011 | Parakulam et al. | 429/50 |
| 2011/0086247 A1 | 4/2011 | Keshavarz et al. | |
| 2011/0086278 A1 | 4/2011 | Friesen et al. | 429/402 |
| 2011/0117411 A1 | 5/2011 | Horne et al. | 429/120 |
| 2011/0189520 A1 | 8/2011 | Carter et al. | 429/107 |
| 2011/0189549 A1 | 8/2011 | Sun et al. | 429/338 |
| 2011/0189551 A1 | 8/2011 | Friesen et al. | 429/405 |
| 2011/0195283 A1 | 8/2011 | Sun et al. | 429/80 |
| 2011/0200853 A1 | 8/2011 | Winter | 429/51 |
| 2011/0200890 A1 | 8/2011 | Kocherginsky | 429/402 |
| 2011/0200893 A1 | 8/2011 | Friesen et al. | 429/404 |
| 2011/0204637 A1 | 8/2011 | Ritter et al. | 290/44 |
| 2011/0206960 A1 | 8/2011 | Winter | 429/70 |
| 2011/0223450 A1 | 9/2011 | Horne et al. | 429/72 |
| 2011/0223451 A1 | 9/2011 | Winter et al. | 429/80 |
| 2011/0244277 A1 | 10/2011 | Gordon, II et al. | 429/51 |
| 2011/0250512 A1 | 10/2011 | Friesen et al. | 429/405 |
| 2011/0256435 A1 | 10/2011 | Kim et al. | 429/94 |
| 2011/0269055 A1 | 11/2011 | Perry | 429/480 |
| 2011/0273022 A1 | 11/2011 | Dennis et al. | 307/72 |
| 2011/0273129 A1 | 11/2011 | Coe et al. | 320/101 |
| 2011/0274950 A1 | 11/2011 | Whitacre | 429/50 |
| 2011/0281169 A1 | 11/2011 | Zheng et al. | 429/231.8 |
| 2011/0281184 A1 | 11/2011 | Friesen et al. | 429/405 |
| 2011/0282807 A1 | 11/2011 | Colello et al. | 705/412 |
| 2011/0300417 A1 | 12/2011 | Mou et al. | 429/50 |
| 2011/0305959 A1 | 12/2011 | Friesen et al. | 429/405 |
| 2011/0311846 A1 | 12/2011 | Whitacre | 429/50 |
| 2011/0311896 A1 | 12/2011 | Harper et al. | 429/447 |
| 2011/0315934 A1 | 12/2011 | Ma et al. | 252/511 |
| 2011/0316485 A1 | 12/2011 | Krishnan et al. | 320/137 |
| 2011/0318619 A1 | 12/2011 | Winter | 429/72 |
| 2011/0318644 A1 | 12/2011 | Zhai et al. | 429/249 |
| 2012/0009491 A1 | 1/2012 | Friesen et al. | 429/418 |
| 2012/0015264 A1 | 1/2012 | Friesen et al. | 429/415 |
| 2012/0021303 A1 | 1/2012 | Amendola et al. | 429/406 |
| 2012/0040254 A1 | 2/2012 | Amendola et al. | 429/406 |
| 2012/0045669 A1 | 2/2012 | Darcy et al. | 429/51 |
| 2012/0045680 A1 | 2/2012 | Dong et al. | 429/109 |
| 2012/0052347 A1 | 3/2012 | Wilson et al. | 429/72 |
| 2012/0052404 A1 | 3/2012 | Friesen et al. | 429/409 |
| 2012/0058370 A1 | 3/2012 | Kell et al. | 429/51 |
| 2012/0064388 A1 | 3/2012 | Whitacre et al. | 429/160 |
| 2012/0068667 A1 | 3/2012 | Friesen et al. | 320/135 |
| 2012/0077067 A1 | 3/2012 | Li et al. | 429/107 |
| 2012/0077068 A1 | 3/2012 | Wang et al. | 429/107 |
| 2012/0077079 A1 | 3/2012 | Li et al. | |
| 2012/0077095 A1 | 3/2012 | Roumi et al. | 429/405 |
| 2012/0107660 A1 | 5/2012 | Li et al. | |
| 2012/0107661 A1 | 5/2012 | Lee et al. | 429/107 |
| 2012/0115069 A1 | 5/2012 | Noack et al. | 429/498 |
| 2012/0129021 A1 | 5/2012 | Winter | 429/67 |
| 2012/0135278 A1 | 5/2012 | Yoshie et al. | |
| 2012/0139496 A1 | 6/2012 | Krishnan et al. | 320/134 |
| 2012/0156535 A1 | 6/2012 | Harrer et al. | 429/82 |
| 2012/0164498 A1 | 6/2012 | Vincent et al. | 429/80 |
| 2012/0168975 A1 | 7/2012 | Perry et al. | 264/29.6 |
| 2012/0171530 A1 | 7/2012 | Lee et al. | 429/70 |
| 2012/0171531 A1 | 7/2012 | Park et al. | 429/70 |
| 2012/0171541 A1 | 7/2012 | Park et al. | 429/107 |
| 2012/0183816 A1 | 7/2012 | Keshavarz et al. | 429/51 |
| 2012/0183872 A1 | 7/2012 | Keshavarz et al. | 429/429 |
| 2012/0185187 A1 | 7/2012 | Parakulam et al. | 702/63 |
| 2012/0185572 A1 | 7/2012 | Parakulam et al. | 709/219 |
| 2012/0202095 A1 | 8/2012 | Winter | |
| 2012/0295172 A1 | 11/2012 | Peled et al. | |
| 2012/0299384 A1 | 11/2012 | Peled et al. | |
| 2013/0084482 A1 | 4/2013 | Chang et al. | |
| 2013/0095362 A1 | 4/2013 | Keshavarz et al. | |
| 2013/0157162 A1 | 6/2013 | Dong et al. | |

(56) References Cited

U.S. PATENT DOCUMENTS

| | | | |
|---|---|---|---|
| 2014/0023943 A1 | 1/2014 | Keshavarz et al. | |
| 2014/0028261 A1 | 1/2014 | Esswein et al. | |
| 2014/0065460 A1 | 3/2014 | Evans et al. | |

FOREIGN PATENT DOCUMENTS

| | | | | |
|---|---|---|---|---|
| JP | 59-205165 | A | 11/1984 | |
| JP | 60-070672 | U | 4/1985 | |
| JP | 60-115174 | A | 6/1985 | |
| JP | 60-148068 | A | 8/1985 | |
| JP | 61-173468 | A | 8/1986 | |
| JP | 61-269866 | A | 11/1986 | |
| JP | 62-52861 | A | 3/1987 | |
| JP | 62-108465 | A | 5/1987 | |
| JP | 62-119874 | A | 6/1987 | |
| JP | 63-24565 | A | 2/1988 | |
| JP | 63-76268 | A | 4/1988 | |
| JP | 63-148563 | A | 6/1988 | |
| JP | 63-150867 | U | 6/1988 | |
| JP | 63-205057 | * | 8/1988 | H01M 8/04 |
| JP | 64-12466 | A | 1/1989 | |
| JP | 64-82465 | A | 3/1989 | |
| JP | S6482465 | A | 3/1989 | |
| JP | 1-176227 | A | 7/1989 | |
| JP | 1-176228 | A | 7/1989 | |
| JP | 6-79491 | B2 | 10/1994 | |
| JP | 6-325784 | A | 11/1994 | |
| JP | H0758625 | B2 | 6/1995 | |
| JP | 8-78042 | A | 3/1996 | |
| JP | 0878042 | | 3/1996 | |
| JP | 2554113 | B2 | 11/1996 | |
| JP | 09-101286 | A | 4/1997 | |
| JP | 2596572 | B2 | 4/1997 | |
| JP | 10-162852 | A | 6/1998 | |
| JP | 3242205 | B2 | 12/2001 | |
| JP | 2002-329523 | A | 11/2002 | |
| JP | 2003142141 | A | 5/2003 | |
| JP | 2003-173812 | A | 6/2003 | |
| JP | 2003173812 | A | 6/2003 | |
| JP | 2003317788 | A | 11/2003 | |
| JP | 2004-335158 | A | 11/2004 | |
| JP | 3642697 | B2 | 4/2005 | |
| JP | 2005-142056 | A | 6/2005 | |
| JP | 2005-209525 | A | 8/2005 | |
| JP | 2005-228617 | A | 8/2005 | |
| JP | 2005-228622 | A | 8/2005 | |
| JP | 2005-228633 | A | 8/2005 | |
| JP | 2005-228645 | A | 8/2005 | |
| JP | 2005-243326 | A | 9/2005 | |
| JP | 2005-322447 | A | 11/2005 | |
| JP | 2005-322448 | A | 11/2005 | |
| JP | 2005-340029 | A | 12/2005 | |
| JP | 2005-340030 | A | 12/2005 | |
| JP | 2005-347106 | A | 12/2005 | |
| JP | 2005-347107 | A | 12/2005 | |
| JP | 3729296 | B2 | 12/2005 | |
| JP | 2006-12425 | A | 1/2006 | |
| JP | 3738227 | B2 | 1/2006 | |
| JP | 2006-40591 | A | 2/2006 | |
| JP | 2006-40648 | A | 2/2006 | |
| JP | 2006-73471 | A | 3/2006 | |
| JP | 2006-93016 | A | 4/2006 | |
| JP | 2006-107988 | A | 4/2006 | |
| JP | 2006-114359 | A | 4/2006 | |
| JP | 2006-114360 | A | 4/2006 | |
| JP | 2006-147306 | A | 6/2006 | |
| JP | 2006-147374 | A | 6/2006 | |
| JP | 2006-147375 | A | 6/2006 | |
| JP | 2006-147376 | A | 6/2006 | |
| JP | 2006-156029 | A | 6/2006 | |
| JP | 3797578 | B2 | 7/2006 | |
| JP | 2006-253023 | A | 9/2006 | |
| JP | 2006-254682 | A | 9/2006 | |
| JP | 2006-302643 | A | 11/2006 | |
| JP | 2006-351346 | A | 12/2006 | |
| JP | 2006351346 | A | 12/2006 | |
| JP | 3922905 | B2 | 5/2007 | |
| JP | 3955130 | B2 | 8/2007 | |
| JP | 2009-16216 | A | 1/2009 | |
| JP | 2009-16217 | A | 1/2009 | |
| JP | 2009-16218 | A | 1/2009 | |
| JP | 2009-16219 | A | 1/2009 | |
| JP | 2010-86935 | A | 4/2010 | |
| JP | 2010-170782 | A | 8/2010 | |
| JP | 2010-244972 | A | 10/2010 | |
| JP | 2010-277810 | A | 12/2010 | |
| JP | 2010-277811 | A | 12/2010 | |
| JP | 2011-119283 | A | 6/2011 | |
| WO | 90/03666 | A1 | 4/1990 | |
| WO | 99/39397 | A1 | 8/1999 | |
| WO | 2004079849 | A1 | 9/2004 | |
| WO | 2005/001981 | A2 | 1/2005 | |
| WO | 2005/014484 | A1 | 2/2005 | |
| WO | 2006135958 | A1 | 12/2006 | |
| WO | 2007/101284 | A1 | 9/2007 | |
| WO | 2007/130659 | A2 | 11/2007 | |
| WO | 2008/148148 | A1 | 12/2008 | |
| WO | 2009/106452 | A1 | 9/2009 | |
| WO | 2009/156259 | A1 | 12/2009 | |
| WO | 2010/094657 | A1 | 8/2010 | |
| WO | 2010/118060 | A1 | 10/2010 | |
| WO | 2010/142080 | A1 | 12/2010 | |
| WO | 2010/143634 | A1 | 12/2010 | |
| WO | 2011/022390 | A2 | 2/2011 | |
| WO | 2011/044778 | A1 | 4/2011 | |
| WO | 2011/075135 | A1 | 6/2011 | |
| WO | 2011/080334 | A2 | 7/2011 | |
| WO | 2011/088761 | A1 | 7/2011 | |
| WO | 2011/111254 | A1 | 9/2011 | |
| WO | 2011/111717 | A1 | 9/2011 | |
| WO | 2011/123102 | A1 | 10/2011 | |
| WO | 2011/129215 | A1 | 10/2011 | |
| WO | 2011/136256 | A1 | 11/2011 | |
| WO | 2011/137895 | A2 | 11/2011 | |
| WO | 2011/149624 | A1 | 12/2011 | |
| WO | 2012/006479 | A2 | 1/2012 | |
| WO | 2012/020277 | A1 | 2/2012 | |
| WO | 2012/022532 | A1 | 2/2012 | |
| WO | 2012/038497 | A2 | 3/2012 | |
| WO | 2012/051156 | A2 | 4/2012 | |
| WO | 2012/051973 | A1 | 4/2012 | |
| WO | 2012/097286 | A1 | 7/2012 | |
| WO | 2013/027076 | A1 | 2/2013 | |
| WO | 2013/110421 | A1 | 8/2013 | |
| WO | 2013/177414 | A1 | 11/2013 | |

OTHER PUBLICATIONS

Office Action issued by the State Intellectual Property Office of the People's Republic of China; Chinese application No. 200980126611.8; issued on Jan. 14, 2013.

International Search Report & Written Opinion issued in PCT Application No. PCT/US2009/049789, mailed on Feb. 25, 2010.

International Preliminary Report on Patentability issued in PCT Application No. PCT/US2009/049789, mailed on Jan. 20, 2011.

International Search Report & Written Opinion issued in PCT Application No. PCT/US2012/020656, mailed on Jun. 27, 2012.

International Search Report & Written Opinion issued in PCT Application No. PCT/US2012/020668, mailed on Jun. 27, 2012.

International Search Report & Written Opinion issued in PCT Application No. PCT/US2012/021095, mailed on Jun. 27, 2012.

Sano, Noriaki, et al. "Synthesis of carbon nanotubes in graphite microchannels in gas-flow and submerged-in-liquid reactors"; Materials Chemistry and Physics; vol. 122; pp. 474-479; Apr. 18, 2010.

Chieng, S.C. et al., "Modification of Daramic, mircoporous separator, for redox flow battery applications"; Univ. New South Wales, School of Chemical Eng. Industrial Chemistry, Kensington N.S.W. 2033, Australie; vol. 75; No. 1-2; pp. 81-91; 1992.

Codina, G. et al., "Development of a 0.1 kW power accumulation pilot plant based on a Fe/Cr redox flow battery Part 1. Considerations on flow-distribution design"; Journal of Power Sources; vol. 48; pp. 293-302; Jul. 23, 1993.

(56) References Cited

OTHER PUBLICATIONS

Codina, G. et al., "Scale-up studies of an Fe/Cr redox flow battery based on shunt current analysis"; Journal of Applied Electrochemistry; vol. 22; pp. 668-674; Sep. 1, 1991.
Cunningham, Brent et al., "Development of bipolar plates for fuel cells from graphite filled wet-lay material and a thermoplastic laminate skin layer"; ScienceDirect; Journal of Power Sources; vol. 165; pp. 764-773; Aug. 7, 2006.
Cunningham, Brent; "Development of Compression Moldable Polymer Composite Bipolar Plates for Fuel Cells"; Virginia Polytechnic Institute and State University Dissertation; Macromolecular Science and Engineering; Feb. 5, 2007.
Demopoulos, George et al., "New Technologies for HCI Regeneration in Chloride Hydrometallurgy"; World of Metallurgy—Erzmetall 61; No. 2; 2008.
Dolle, Mickael et al., "Synthesis of nanosized zirconium carbide by a sol-gel route"; Journal of European Ceramic Society; ISSN 0955-2219; 2007.
Erkoc, E. et al., "Effect of pulsed flow on the performance of carbon felt electrode"; Chemical Engineering Journal; vol. 85; pp. 153-160; Feb. 7, 2001.
Faith, Khalid et al., "Advancements in the Direct Hydrogen Redox Fuel Cell"; Electrochemical and Solid-State Letters; 11 (2) B11-B15; Aug. 16, 2007.
Fedkiw, Peter et al., "Mathematical Model for the Iron/Chromium Redox Battery"; Department of Chemical Engineering, North Carolina State University, Admittance Study of the Pb Electrode; Apr. 1984.
Friedrich J.M. et al., "Reticulated vitreous carbon as an electrode material"; Journal of Electroanalytical Chemistry; Apr. 10, 2003.
Gahn, Randall et al., "Cycling Performance of the Iron-Chromium Redox Energy Storage System"; National Aeronautics and Space Administration; Cleveland, Ohio; Aug. 18-23, 1985.
Gahn, Randall et al., "Preformance of Advanced Chromium Electrodes for the NASA Redox Energy Storage System"; National Aeronautics and Space Adminstration; Cleveland, Ohio; Nov. 1981.
Gahn, Randall et al., "Single Cell Preformance Studies on the Fe/Cr Redox Energy Storage System using Mixed Reactant Solutions at Elevated Temperature"; Intersociety Energy Conversion Engineering Conference; vol. 4; Aug. 21-26, 1983.
Giner, J. et al., "Advanced Screening of Electrode Couples"; National Aeronautics and Space Administration; Cleveland, Ohio; Feb. 1980.
Giner, J. et al., "Screening of Redox Couples and Electrode Materials"; Giner, Inc., National Aeronautics and Space Administration; Cleveland, Ohio; Sep. 1976.
Gonzalez-Garcia, Jose et al., "Hydrodynamic Behavior of a Filter-Press Electrochemical Reactor with Carbon Felt as a Three-Dimensional Electrode"; American Chemistry Society; vol. 37; pp. 4501-4511; 1998.
Gonzalez-Garcia, Jose et al., "Characterization of a carbon felt electrode: structural and physical properties"; Journal of Materials Chemistry.
Hagg, Ch. M. et al., "Novel bipolar electrodes for battery applications"; Journal of Applied Electrochemisty; vol. 32; pp. 1063-1069.
Hamamoto, Osamu et al., "Research and Development of 10kw Class Redox Flow Battery"; NEDO; Proceedings of the 20th Intersociety Energy Conversion Engineering Conference; vol. 2; Aug. 1985.
Hodgson, Isaac; "Pressure Drop, Liquid Holdup and Mass Transfer in a Graphite Fiber Bed with Upward Co-Current Gas-Liquid Flow"; B. Sc (Hons) University of Science and Technology; Ghana; Aug. 1993.
Hollax, E. et al., "The Influence of Oxidative Pretreatment of Graphite Electrodes on the Catalysis of Cr3/Cr2 and Fe2/Fe2 Redox Reactions"; Carbon; vol. 23; No. 6; pp. 655-664; Received Oct. 8, 1984; Revised Dec. 17. 1984.
Inoue, M. et al., "Carbon Fiber Electrod for Redox Flow Battery"; Journal of the Electrochemical Society; Accelerated Brief Communications; Mar. 1987.

Izawa, Hidetaka, "Research and Development of 10kw Class Redox Flow Battery"; 21st Intersociety Energy Conversion Engineering Conference; Advancing Toward Technology Breakout in Energy Conversion; Aug. 25-29, 1986.
Jain, Anubhav, "Systhesis and Processing of Nanocrystalline Zirconium Carbide Formed by Carbothermal Reducation"; A Thesis presented to The Academic Faculty; Georgia Institute of Technology; Aug. 2004.
Jalan, Vinod et al., "Optimization and Fabrication of Porous Carbon Elecrodes for Fe/Cr Redox Flow Cells"; U.S. Department of Energy Conservation and Renewable Energy Division of Energy Storage Systems; Jul. 1982.
Jalan, Vinod et al., "Requirements for Optimization of Electrodes and Electrolyte for the Iron/Chromium Redox Flow Cell"; National Aeronautics and Space Administration; Sep. 1981.
Joerissen, Ludwig et al., "Possible use of vanadium redox-flow batteries for energy storage in-small grids and stand-alone photovoltaic systems"; Science Direct ; Journal of Power Sources; vol. 127; pp. 98-104; 2004.
Johnson, David et al., "Chemical and Electrochemical Behavior of the Cr(III)/Cr(II) Half-Cell in the Iron-Chromium Redox Energy Storage System"; J. Electrochem. Soc.; Electrochemical Science and Technology; May 1985.
Jones, Janet et al., "Ligand Bridging in the Oxidation of Chromium (II) at Mercury Electrodes"; California Institute of Technology; Pasadena, CA; Jan. 24, 1964.
Kim, Jun Gyu et al., "Microstructure and mechanical properties of chemical vapor deposited ZrC film on SiC/graphite substrate"; Journal of Ceramic Processing Research; vol. 10; No. 1; pp. 21-24; 2009
Kuhn, A.T. et al., "Electrical leakage currents in bipolar cell stacks"; Journal of Applied Electrochemisty; vol. 10; pp. 233-237; Mar. 27, 1979.
Lampitt, L.H. et al., "The photochemical oxidation of ascorbic acid in solutions containing oxalic acid. II—Mechanisn of the reacton"; Journal of the Science of Food and Agriculture; vol. 7; issue 2; pp. 120-124; http://onlinelibrary.wiley.com; published online May 8, 2006.
Leong, Chia-ken et al., "Pressure Electrical Contact Improved by Carbon Black Paste"; Journal of Electronic Materials; vol. 33; No. 3; 2004.
Lopez-Atalaya, M. et al., "Behavior of the Cr(III)/Cr)II) reaction on fold-graphite electrodes. Application to redox flow storage cell"; Journal of Power Sources; vol. 35; pp. 225-234; Oct. 5, 1990.
Lopez-Atalaya, M. et al., "Optimization studies on a Fe/Cr redox flow battery"; Journal of Power Sources; vol. 39; pp. 147-154; Nov. 15, 1991.
Cnobloch, H et al., "Redox Ion Flow Cell for Solar Energy Storage"; Siemens Forsch—u. ENtwickl.-Ber. Bd. 12; 1983.
Mayer, Peter et al., "Electocatalysis of redox reactions by metal nanoparticles on graphite electrodes"; Journal of Solid State Electrochem; vol. 5; pp. 402-411; published online May 16, 2001.
Middelman, E. et al., "Bipolar plates for PEM fuel cells"; Science Direct; Journal of Power Sources; vol. 118; pp. 44-46; 2003.
Mohammadi, Touraj et al., "Modification of a Composite Membrane for Redox Flow Battery Applications"; Iranian Palyn er Animal I, vol. 6, No. I; School of Chem. Eng. and Ind. Chem; Unvi. Of New South Wales.
Mohammadi, F. et al., "Overcharge in the vanadium redox battery and changes in electrical resistivity and surface functionality of graphite-felt electrode"; Journal of Power Sources; vol. 52; pp. 61-68.
Muller, A. et al., "Injection moulding of graphite composite bipolar plates"; Science Direct; Journal of Power Sources; vol. 154; pp. 467-471; available online Dec. 28, 2005.
Nava, J.L. et al., "Mass Transport and Potential Studies in a Flow-through Porous Electrode Reactor. A Comparative Study of Reticulated Vitreous Carbon and Graphite Felt Used as Cathode"; Portugaliae Electrochimica Acta ISSN 1647-1571; Nov. 20, 2008.
Noah, Karl et al., "Hydrogen Reduction of Ferric Ions for Use in Copper Electrowinning"; Idaho National Engineering and Environmental Laboratory; Jan. 2005.

(56) References Cited

OTHER PUBLICATIONS

Nokazi, Ken et al., "Performance of ETL 1 KW Redox Flow Cell"; 18$^{th}$ Intersociety Energy Conversion Engineering Conference; vol. 4; Aug. 21-26, 1983.

Nozaki, Ken et al., "Performance of ETL new 1 KW Redox Flow Cell System"; 19th Intersociety Energy Conversion Engineering Conference; vol. 2; Aug. 19-24, 1984.

Nozaki, Ken et al., "Research and Development of Redox-Flow Battery"; 17th Intersociety Energy Conversion Engineering Conference; Aug. 8-12, 1982.

Oei, Djong-Gie, "Permeation of vanadium cations through anionic and cationic membranes"; Journal of Applied Electrochemistry; vol. 15; No. 2; pp. 231-235; Mar. 1985.

Ozdemir, T. et al., "Treatment of Waste Pickling Liquors: Process Synthesis and Economic Analysis"; Chemical Engineering Communications; vol. 193; Issue 5; May 2006.

Pecsok, R.L. et al., "Metal Ammine Formation in Solution XI. Stability of Ethylenediamine Complexes and the Coordinationa Number of Chromium (II)"; Univ. of Denmark; Acta Chem. Scand.; vol. 11; No. 8; 1957.

Petrii, O.A. et al., "The nature of anomalous cathodic behavior of metals with high hydrogen overpotential: thallium in acidic solutions"; Russian Journal of Electrochemistry; vol. 31; pp. 921-929; 1995.

Ponce de Leon, C. et al., "Redox flow cells for energy conversion"; Science Direct; Journal of Power Sources; vol. 60; pp. 716-732; Oct. 19, 2005.

O'Donnell, Patricia et al., "The Redox Flow System for Solar Photovoltaic Energy Storage"; E-9006; STAR Category 44; National Aeronautics and Space Administration; Lewis Research Center; Cleveland, Ohio; 1976.

International Search Report & Written Opinion issued PCT Application No. PCT/US2012/031174, mailed on Nov. 7, 2012.

International Search Report & Written Opinion issued in PCT Application No. PCT/US2011/063787, mailed on Jul. 30, 2012.

International Preliminary Report on Patentability issued in International Application No. PCT/US2012/021095, having a mailing date of Jul. 25, 2013.

International Preliminary Report on Patentability issued in International Application No. PCT/US2012/031174, having a mailing date of Oct. 10, 2013.

International Preliminary Report on Patentability issued in International Application No. PCT/US2011/063787, having a mailing date of Jun. 20, 2013.

International Preliminary Report on Patentability issued in International Application No. PCT/US2012/020656, having a mailing date of Jun. 18, 2013.

International Preliminary Report on Patentability issued in International Application No. PCT/US2012/020668, having a mailing date of Jun. 18, 2013.

European Search Report issued in European Application No. 12762830 (PCT/US2012/031174) mailed on Aug. 6, 2014.

Shah et al., A Dynamic Performance Model for Redox-Flow Batteries Involving Soluble Species, Electrochimica Acta 53 (2008) 8087-8100, Elsevier. Jun. 2, 2008.

Extended European Search Report issued in European Application No. 09795056, having a mailing date of Mar. 31, 2014.

* cited by examiner

REBALANCING ELECTROLYTES IN REDOX FLOW BATTERY SYSTEMS

RELATED APPLICATIONS

This application claims the benefit of priority to U.S. Provisional Patent Application No. 61/468,738, filed Mar. 29, 2011, the entire contents of which are incorporated herein by reference.

STATEMENT REGARDING FEDERALLY SPONSORED RESEARCH

Inventions included in this patent application were made with Government support under DE-OE0000225 "Recovery Act—Flow Battery Solution for Smart Grid Renewable Energy Applications" awarded by the US Department of Energy (DOE). The Government has certain rights in these inventions.

FIELD OF THE INVENTION

This invention generally relates to reduction-oxidation (redox) flow batteries and more particularly to mitigating and/or reversing effects of reactant imbalances in liquid electrolytes.

BACKGROUND

Flow batteries are electrochemical energy storage systems in which electrochemical reactants are dissolved in liquid electrolytes. The liquid electrolytes are pumped through reaction cells where electrical energy is either converted to or extracted from chemical potential energy in the reactants by way of reduction and oxidation reactions. In applications where megawatts of electrical energy are to be stored and discharged, a redox flow battery system may be expanded to a required energy storage capacity by increasing tank sizes. A flow battery system may be expanded to produce the required output power by increasing the number or size of electrochemical cells or cell blocks. A variety of flow battery chemistries and arrangements are known in the art.

SUMMARY

In one embodiment, a flow battery electrolyte rebalancing system includes a first reaction cell, which in turn includes a first half-cell chamber in fluid communication with a first source of a liquid battery electrolyte, a second half-cell chamber in fluid communication with a second source of a mediator electrolyte including dissolved ferrous iron ($Fe^{2+}$) ions, and a separator membrane between the first half-cell chamber and the second half-cell chamber. The flow battery electrolyte rebalancing system also comprises a second reaction cell including a replenishable source of metallic iron and in fluid communication with the mediator electrolyte.

In another embodiment, a flow battery electrolyte rebalancing system includes a reaction cell having a first half-cell chamber in fluid communication with a source of a liquid battery electrolyte. A second half-cell chamber is in fluid communication with a solution that consists essentially of an acid selected from the group consisting of sulphuric acid, phosphoric acid, sulfamic acid, and fluoroboric acid. A cation exchange membrane is between the first half-cell and the second half-cell.

BRIEF DESCRIPTION OF DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
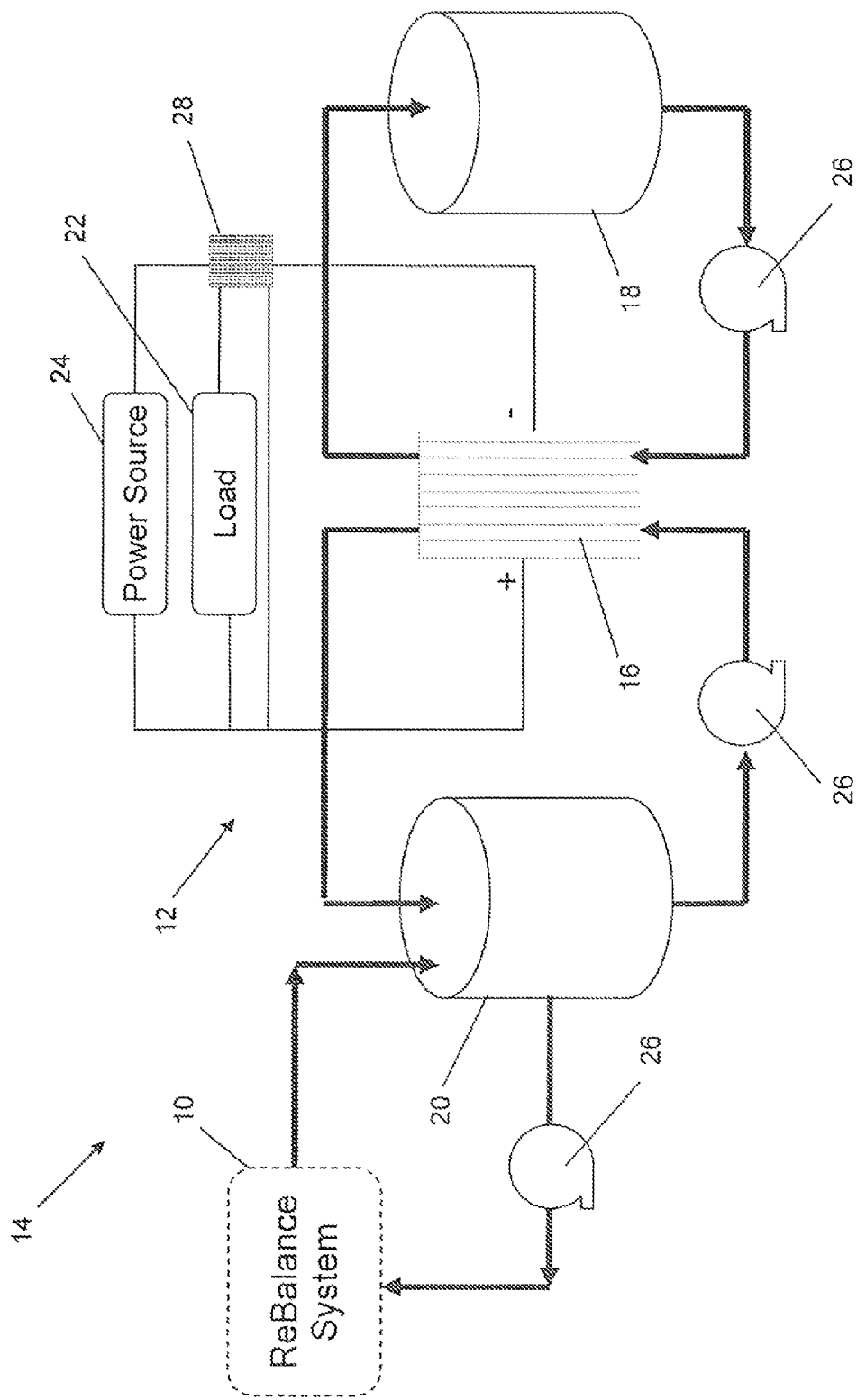
FIG. 1 illustrates a schematic block diagram of an electrolyte rebalance system integrated into a redox flow battery according to one embodiment.

In some redox flow battery systems based on the Iron/Chromium (Fe/Cr) redox couple, the catholyte (in the positive half-cell) contains $FeCl_3$, $FeCl_2$ and HCl. The anolyte (in the negative half-cell) contains $CrCl_3$, $CrCl_2$ and HCl. Such a system is known as an "un-mixed reactant" system. In a "mixed reactant" system, the anolyte also contains $FeCl_2$, and the catholyte also contains $CrCl_3$.

After a number of charge/discharge cycles, the catholyte and anolyte may become unbalanced because of side reactions during charge and/or discharge operations. For example, in the case of an Fe/Cl redox flow battery, a hydrogen generation side-reaction occurs at the negative electrode during the charge cycle. Such side reactions cause an imbalance in electrolyte concentrations by converting more reactant in one half-cell to a higher state of oxidation (SOO) than occurs in the other half-cell. In this unbalanced state, the concentration of $Fe^{3+}$ may in the positive half cell be higher than that of $Cr^{2+}$ in the negative half cell. The imbalance decreases the capacity of the battery and is undesirable. The rate of hydrogen generation, and thus the rate at which imbalance increases, may also increase at a higher state-of-charge (SOC) of the flow battery.

The unbalanced state may be corrected by processing the catholyte in a rebalancing cell. Several rebalancing systems have been used in the past, including an Iron/Hydrogen fuel cell as described in U.S. Pat. No. 4,159,366. The '366 patent describes a rebalancing system including an electrolytic rebalance cell configured to oxidize waste hydrogen at a rebalance cell anode and reduce excess $Fe^{3+}$ ions to $Fe^{2+}$ ions at a rebalance cell cathode. $H_2$ may be recycled from the negative electrolyte and directed into the rebalance cell along with a portion of the positive electrolyte. A catalyst may be used to promote the reaction with or without application of a driving current. Another example of a similar cell is provided in "Advancements in the Direct Hydrogen Redox Fuel Cell" by Khalid Fatih, David P. Wilkinson, Franz Moraw, Alan Ilicic and Francois Girard, published electronically by the Electrochemical Society Nov. 26, 2007.

Unfortunately, existing rebalance cells rely on prohibitively expensive components, are undesirably inefficient, or produce undesirable byproducts. Therefore, new redox flow battery electrolyte rebalancing systems are needed.

As used herein, the phrase "state of charge" and its abbreviation "SOC" refer to the ratio of stored electrical charges (measured in ampere-hour) to charge storage capacity of a complete redox flow battery system. In particular, the terms "state of charge' and "SOC" may refer to an instantaneous ratio of usable charge stored in the flow battery to the full theoretical charge storage capacity of the flow battery system. In some embodiments, "usable" stored charge may refer to stored charge that may be delivered at or above a threshold voltage (e.g. about 0.7 V in some embodiments of an Fe/Cr flow battery system). In some embodiments, the theoretical charge storage capacity may be calculated excluding the effects of unbalanced electrolytes.

As used herein the phrase "state of oxidation" and its abbreviation "SOO" refer to the chemical species composition of at least one liquid electrolyte. In particular, state of oxidation and SOO refer to the proportion of reactants in the electrolyte that have been converted (e.g. oxidized or reduced) to a "charged" state from a "discharged" state. For example, in a redox flow battery based on an Fe/Cr redox couple, the state of oxidation of the catholyte (positive electrolyte) may be defined as the percent of total Fe which has been oxidized from the $Fe^{2+}$ form to the $Fe^{3+}$ form, and the state of oxidation of the anolyte (negative electrolyte) may be defined as the percent of total Cr which has been reduced from the $Cr^{3+}$ form to the $Cr^{2+}$ form. Although many of the embodiments herein are described with reference to an Fe/Cr flow battery chemistry, it should be appreciated with the benefit of the present disclosure that some embodiments are applicable to flow battery systems (and some hybrid flow battery systems) using other reactants.

In some embodiments, the state of oxidation of the two electrolytes may be changed or measured independent of one another. Thus, the terms "state of oxidation" and "SOO" may refer to the chemical composition of only one electrolyte, or of both electrolytes in an all-liquid redox flow battery system. The state of oxidation of one or both electrolytes may also be changed by processes other than desired charging or discharging processes. For example, undesired side reactions may cause oxidation or reduction of active species in one electrolyte without producing a corresponding reaction in the second electrolyte. Such side reactions may cause the respective SOOs of the positive and negative electrolytes to become unbalanced such that one electrolyte has a higher effective SOO than the other.

The embodiments below include systems and methods for rebalancing flow battery electrolytes in order to return the concentrations of active reactants dissolved in the electrolytes substantially nearer to equality. Below are several embodiments for rebalancing electrolytes in redox flow batteries. Although many of these embodiments are described with reference to Fe/Cr flow batteries, the same principles and concepts may also be applied to other flow battery chemistries.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In some embodiments, an electrolyte rebalance system 10 may be integrated into a redox flow battery 12 as illustrated, for example, in FIG. 1. A flow battery system 14 may generally include a reaction stack assembly 16 fluidically joined to electrolyte storage tanks 18, 20. The reaction stack assembly 16 may be electrically connected to an electric load 22 and/or source 24. In some embodiments, the electrolyte storage tanks 18, 20 may be divided into four tank volumes, or four separate tanks may be provided to separate charged electrolytes from discharged electrolytes. Any number of pumps 26 may be provided to move electrolytes throughout the flow battery system 14. A control system 28 may also be provided to control charging, discharging, rebalancing or other processes according to desired methods or algorithms.

Thus, in some embodiments, an electrolyte storage tank 20 connected to a reaction stack assembly 16 may contain a positive electrolyte (catholyte) with charged cathode reactant ions (e.g., $Fe^{3+}$) and discharged cathode reactant ions (e.g. $Fe^{2+}$). If a catholyte tank contains an excess quantity of charged cathode reactant ions (e.g., excess $Fe^{3+}$) relative to a corresponding concentration of charged anode reactant ions (e.g., $Cr^{2+}$), the catholyte may need to be rebalanced. In other embodiments, a flow battery may become un-balanced in the opposite direction such that the anolyte may contain an excess concentration of charged anode reactant ions relative to a corresponding concentration of cathode reactant ions. In either case, one or both electrolytes may be treated chemically or electrochemically in an electrolyte rebalance system 10 in order to bring the relative concentrations of reactant forms into balance.

Flow-Through Electrolytic Cell

Figure 2:
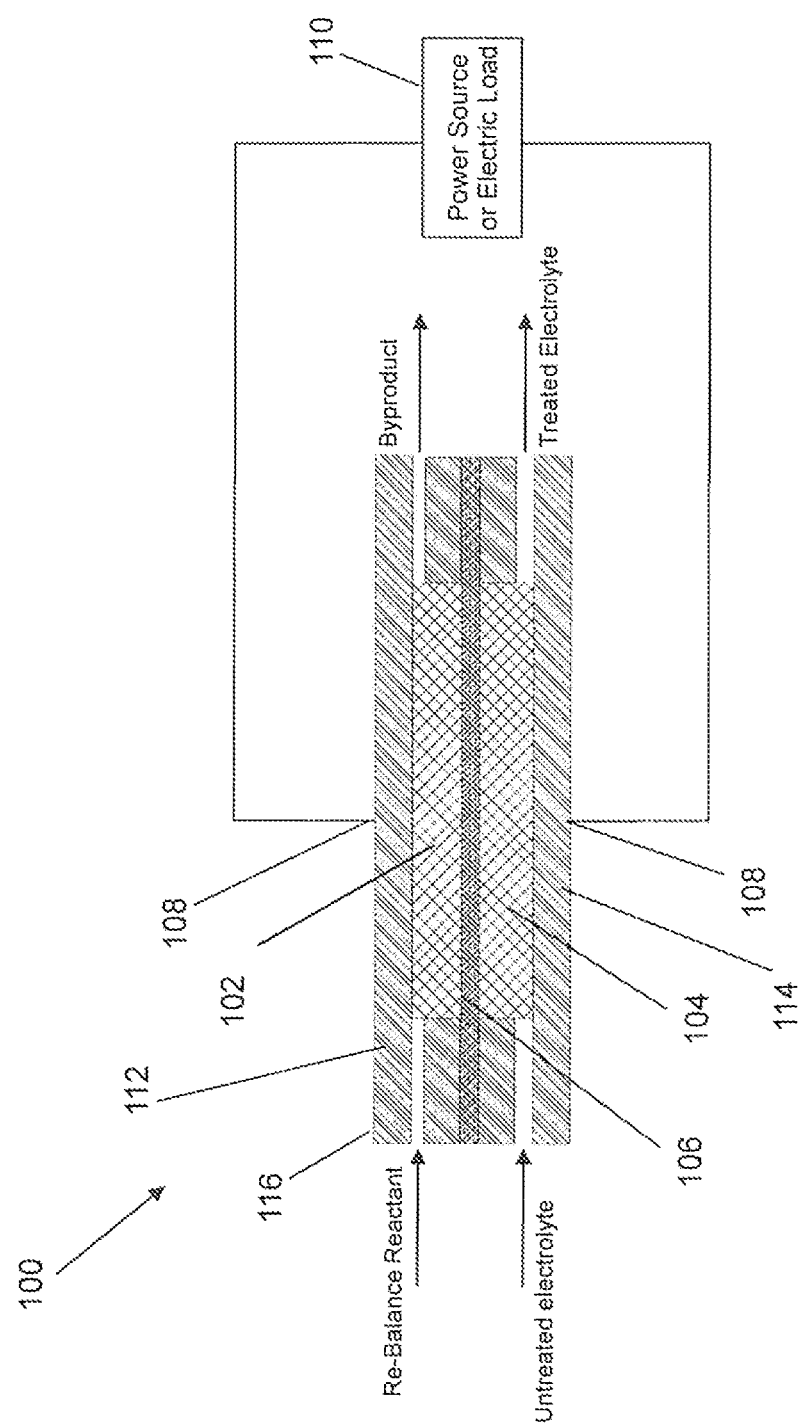
FIG. 2 illustrates a schematic block diagram of an electrolytic or galvanic flow-through rebalance cell according to one embodiment.

In some embodiments, unbalanced redox flow battery electrolytes may be rebalanced in an electrolytic or galvanic flow-through rebalance cell 100, an example of which is illustrated in FIG. 2. In some embodiments, such a flow-through rebalance cell 100 may be configured to use only a liquid rebalance reactant and to produce only a substantially innocuous gas as a byproduct. In some embodiments, electrolytes may be rebalanced by treating either the catholyte (e.g. reducing $Fe^{3+}$ to $Fe^{2+}$ in some embodiments) or anolyte (e.g. reducing $Cr^{3+}$ to $Cr^{2+}$ in some embodiments) in an electrolytic or galvanic rebalance cell.

FIG. 2 illustrates an embodiment of a flow-through rebalance cell 100 including an anode chamber 102 and a cathode chamber 104 separated by a separator membrane 106. In some embodiments, one or both chambers 102, 104 may contain porous electrodes of carbon felt or other suitable flow-through electrode material. For example, any material that is conductive and inert in the electrolyte may be used as a porous or solid electrode that may be placed within or formed integrally with a portion of one or both cell chambers. In some embodiments, a surface of one or both electrodes may be treated, plated or otherwise coated with a catalyst material selected to promote desired reactions or to suppress undesired reactions. A flow-through rebalance cell 100 may also include electrical terminals 108 for electrically connecting the flow-through rebalance cell 100 to a power source or electric load 110. In some embodiments, a plurality of flow-through rebalance cells 100 may be combined into a rebalance cell block.

In some embodiments the separator membrane 106 may be an ion exchange membrane (e.g., a cation exchange membrane). In other embodiments, the separator membrane 106 may be a porous membrane. In some embodiments, the flow-through rebalance cell 100 may include one or more bipolar plates or terminal plates 112, 114 in contact with an electrode within the anode and cathode chambers 102, 104, respectively. In alternative embodiments, one or both chambers 102, 104 may be partially or entirely made of a material capable of conducting an electric current into the cell contents. For example, in some embodiments a rebalance cell body 116 may be entirely or partially machined from a solid block of graphite. In other embodiments, a rebalance cell body 116 may be molded from a conductive polymer composite material.

In some embodiments, the flow-through rebalance cell 100 may be operated as an electrolytic cell by applying a driving current sufficient to drive a desired electrochemical reaction. In other embodiments, the flow-through rebalance cell 100 may be operated as a galvanic cell by applying a load across the terminals 108 to allow a spontaneous electrochemical reaction to occur.

In some embodiments, the cathode chamber 104 may be configured and joined to a flow battery system 14 to direct an electrolyte into the cathode chamber 104. The anode chamber 102 may be configured and connected to a source of a rebalance reactant such that the rebalance reactant may be directed into and/or through the anode chamber 102. For example, in some embodiments, the rebalance reactant may be introduced at a rate sufficient to replenish consumed reactants. In some embodiments, the rebalance reactant may include a liquid with a chemical composition selected to act as a reducing agent capable of reducing the un-balanced electrolyte reactant to a desired form when the two are reacted in a rebalance cell. In other embodiments, a rebalance reactant may include an ionic species selected to act as a reducing agent capable of reducing a species in the un-balanced electrolyte.

In-Tank Electrolytic Reaction Cell

Figure 3:
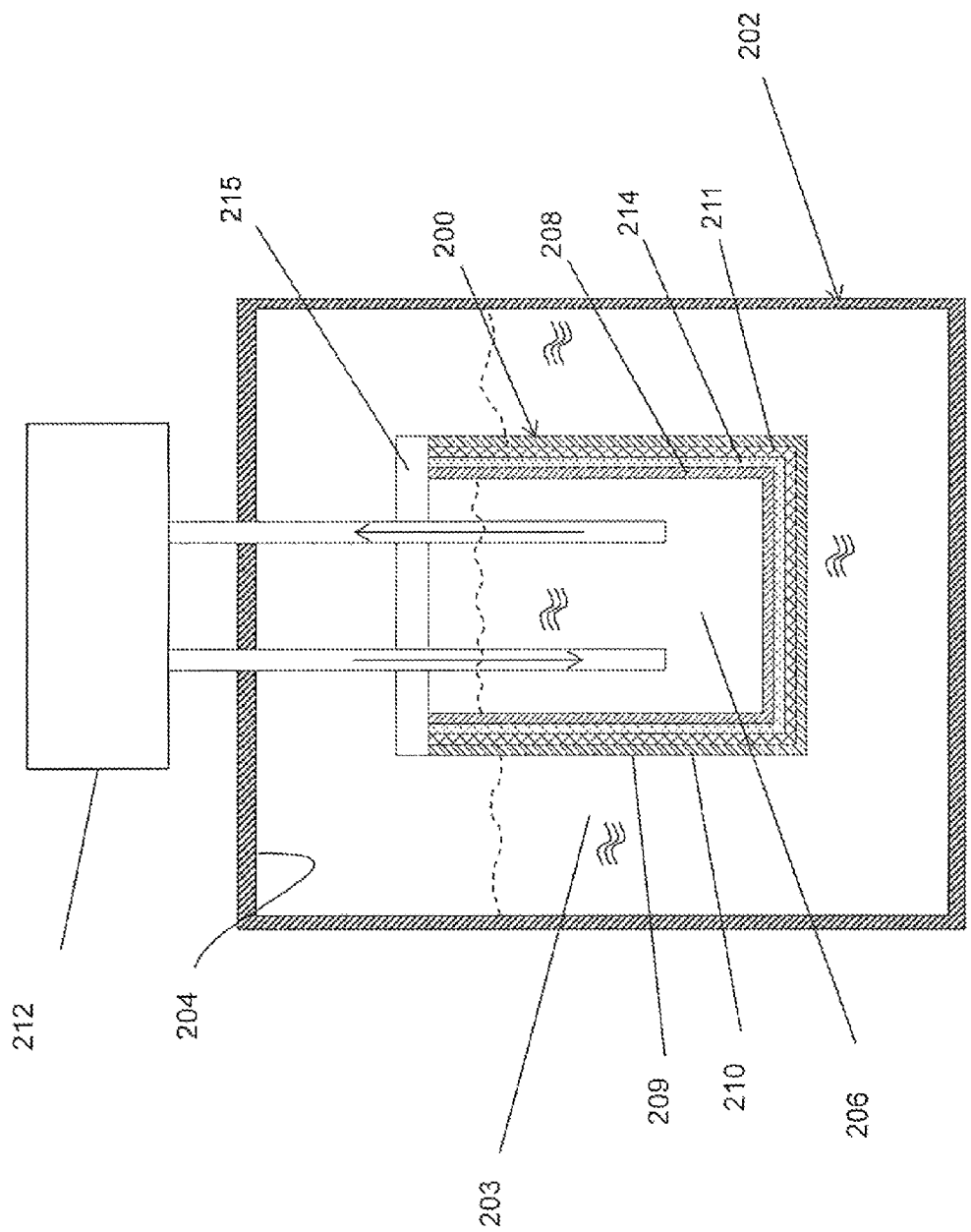
FIG. 3 illustrates a schematic block diagram of an electrolytic rebalance cell configured to be submerged in a storage tank.

In some embodiments, an electrolytic reaction cell may be configured for placement within a tank. FIG. 3 illustrates an embodiment of an in-tank electrochemical cell 200 configured to be submerged in a liquid storage tank ("electrolyte tank") 202 containing an electrolyte 203 (e.g., a flow battery electrolyte or a mediator electrolyte). In some embodiments, an in-tank electrochemical cell 200 may be mounted to an interior wall 204 of a liquid storage tank 202. An in-tank electrochemical cell 200 may be generally configured such that an exterior surface of the cell may operate as one "flow-through" electrode, and an interior of the in-tank electrochemical cell 200 may operate as the second flow-through electrolyte chamber. In some embodiments, an interior chamber 206 which in some embodiments may include an inner electrode layer 208 formed from a porous electrode material and filling at least a portion of the interior chamber 206.

In some embodiments, a portion of an outer wall 209 of an in-tank electrochemical cell 200 may include an outer electrode layer 210 positioned as an outer layer and configured to act as an electrode for electrolyte 203 in the liquid storage tank 202. The outer electrode layer 210 may include or consist of any suitable electrically conductive non-reactive (inert) material, such as a carbon or graphite felt material.

A separator layer 214 may be positioned between the inner electrode layer 208 and the outer electrode layer 210. In some embodiments, the separator layer 214 may include or consist of an ion selective membrane such as a cation exchange membrane or an anion exchange membrane. In other embodiments, the separator layer 214 may include or consist of a porous separator membrane material.

In some embodiments, an in-tank electrochemical cell 200 may have a structural member 211 that may be made of a suitable plastic or other non-reactive material. The structural member 211 may include or consist of a lattice structure or other shape configured to structurally support the internal electrode, separator layer 214 and the outer electrode layer 210 while causing minimal interruption to the electrochemical reactions.

The electrode of the interior chamber 206 and the outer electrode layer 210 may be connected to a source of electric current in order to operate the in-tank electrochemical cell 200 as an electrolytic cell. In other embodiments, if a desired reaction proceeds spontaneously, the in-tank electrochemical cell 200 may be operated as a galvanic cell by short-circuiting the two electrodes, or by connecting the electrodes to an electric load.

In some embodiments, an in-tank electrochemical cell may include a lid member 215 which may incorporate electrical connections to the interior electrode layer 208 and outer electrode layer 210. A lid member 215 may also include a structural connection with the structural member 211. The lid member 215 may also include a seal to prevent leakage of electrolyte 203 into or out of the interior chamber 206. In some embodiments, an in-tank electrochemical cell 200 may have a generally cylindrical shape. In other embodiments, an in-tank electrochemical cell 200 may be in the shape of a rectangular prism or any other geometric shape.

In some embodiments, the interior chamber 206 may be joined in fluid communication with a source 212 of rebalance reactant. In some embodiments, a pump or other circulating device may be used to transport a desired quantity of rebalance reactant from the source 212 to the in-tank electrochemical cell 200. In alternative embodiments, rebalance reactant may flow from the source 212 to the in-tank electrochemical cell 200 by gravity, hydrostatic pressure or other passive means.

In some embodiments of operation of an in-tank electrochemical cell 200, an electric current may be applied to electrodes of the in-tank electrochemical cell 200 to drive a desired electrochemical reaction between the electrolyte 203 and the rebalance reactant. Examples of such reactions are provided below. In some embodiments, the in-tank electrochemical cell 200 may be configured to be removed or sealed off from contact with the electrolyte 203 when the rebalance is not in use.

For clarity of illustration, the relative size of the in-tank electrochemical cell 200 may be exaggerated in FIG. 3 relative to the tank 202 in some embodiments. In some embodiments, a circulation pump may be disposed within the liquid storage tank 202 to circulate electrolyte 203 over the in-tank electrochemical cell 200 to promote a complete rebalancing reaction.

Direct Iron Rebalancing

In some embodiments, an excess quantity of a charged catholyte reactant, such as excess $Fe^{3+}$, may be reduced by a spontaneous chemical reaction with metallic iron according to the equation:

$$Fe + 2Fe^{3+} \rightarrow 3Fe^{2+} \quad [1]$$

In order for this reaction to occur spontaneously, the electrolyte containing excess $Fe^{3+}$ must be in direct contact with the metallic iron. The reaction of equation [1] may be used to directly rebalance a catholyte within a catholyte storage tank or in a separate reaction environment. In some embodiments, a source of metallic iron, such as a block of iron may simply be placed into an electrolyte tank. In other embodiments, it may be desirable to control the extent and/or the rate of the rebalancing reaction.

Figure 4B:
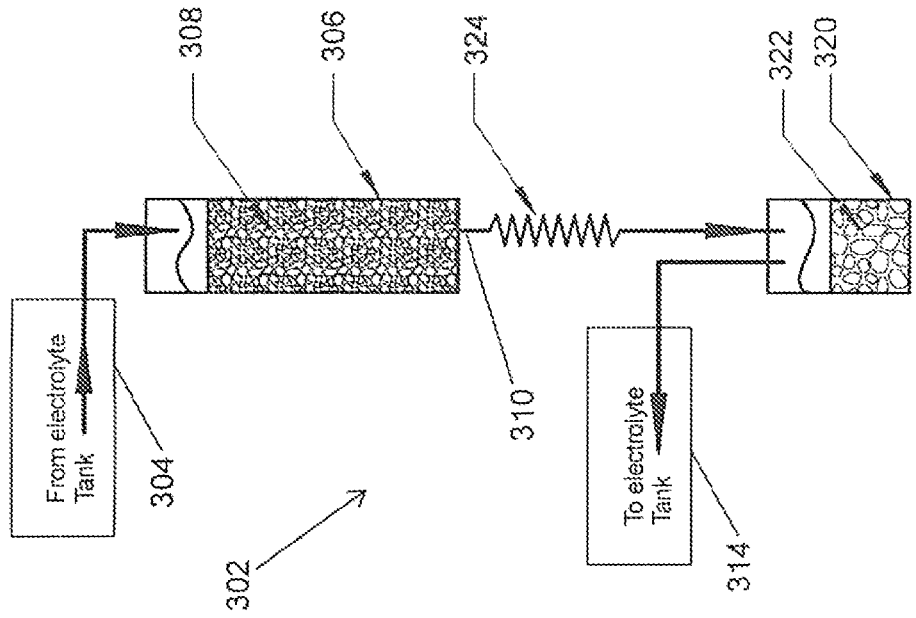
FIG. 4B is a schematic illustration of an embodiment of a direct iron rebalancing system with a crystallization system.

The product $Fe^{2+}$ is a component of the electrolyte and is not detrimental to the battery, but the extra $FeCl_2$ generated in the reaction of equation [1] has to be removed from the electrolyte, either by dilution and removal of part of the solution (e.g. using a system 300 such as that illustrated in FIG. 4A), or by crystallizing and removing $FeCl_2 \cdot 4H_2O$ crystals (e.g., using a system 302 such as that illustrated in FIG. 4B).

Figure 4A:
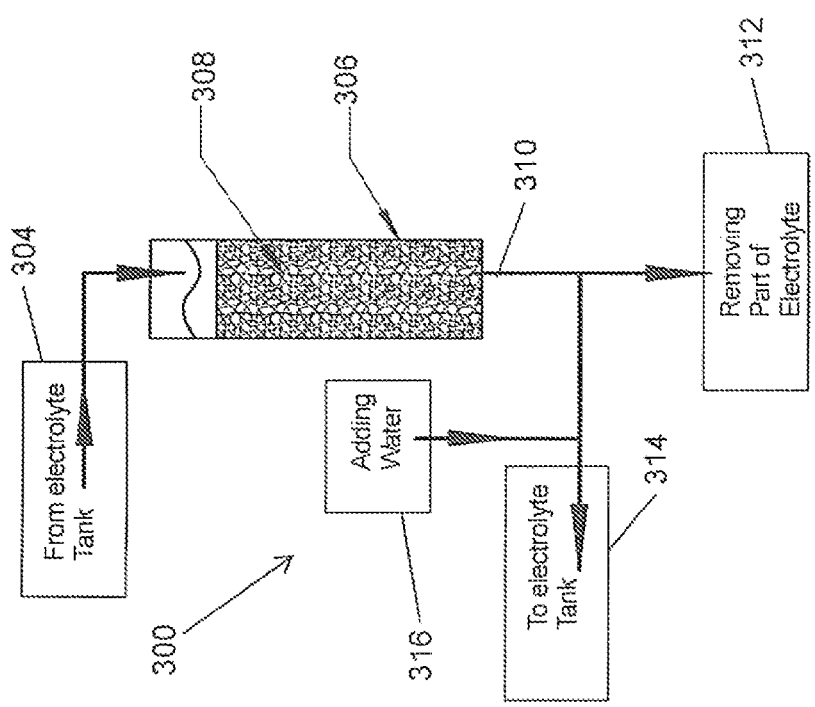
FIG. 4A is a schematic illustration of an embodiment of a direct iron rebalancing system with a dilution system.

As shown in FIG. 4A, a quantity of electrolyte may be directed as indicated at 304 through a reactor 306 in the form of a column of metallic iron chips 308 configured such that electrolyte may flow through the column while directly contacting a substantial surface area of the metallic iron chips 308. At an output 310 of the reactor 306, some portion of the electrolyte may be diverted and removed, as indicated at 312, while a remaining portion is directed back into the electrolyte tank as indicated at 314 along with a diluting solution (e.g. water or an aqueous supporting electrolyte solution) as indicated at 316. In some embodiments, the composition of the rebalanced electrolyte returning to the electrolyte tank may be maintained within a desired range by controlling the relative flow rates of diverted electrolyte, returned electrolyte and diluting solution in the system 300 of FIG. 4A.

Alternatively, as shown in the system 302 of FIG. 4B, at the outlet 310 of the reactor 306, the electrolyte may be cooled and then directed through a crystallization chamber 320 which may include some quantity of seed crystals (FeCl$_2$ 4H$_2$O) 322 to encourage the formation of FeCl$_2$ crystals. Because solubility is a function of temperature, the electrolyte exiting the column may be cooled to a temperature at which a desired quantity of FeCl$_2$ crystallizes out of the rebalanced electrolyte solution. In some embodiments, the extent of crystallization and thereby the composition of the rebalanced electrolyte returning to the electrolyte tank may be maintained within a desired range by controlling the temperature of the electrolyte entering the crystallization tank, such as by a cooling coil 324.

Two-Loop Iron Rebalancing

In some embodiments, the reaction of equation [1] may be undesirable due to difficulty in controlling the extent or rate of rebalancing or due to additional contaminants that may be present in a particular source of metallic iron. Therefore, in order to utilize the reaction of Equation [1] with better control, and with a reduced possibility for contamination of the electrolyte, a two-stage rebalance system may be used.

With further reference to FIG. 1, an Fe/Cr redox flow battery 12 may be rebalanced by reducing excess Fe$^{3+}$ to Fe$^{2+}$. Thus, in some embodiments, an electrolyte storage tank 20 connected to a redox flow battery 12 may contain a positive redox flow battery electrolyte (catholyte) with charged iron ions (Fe$^{3+}$) and discharged iron ions (Fe$^{2+}$). If the catholyte tank contains an excess quantity of charged iron ions (Fe$^{3+}$), the catholyte may be rebalanced in a two-stage rebalancing system 400 such as that illustrated in FIG. 5.

Figure 5:
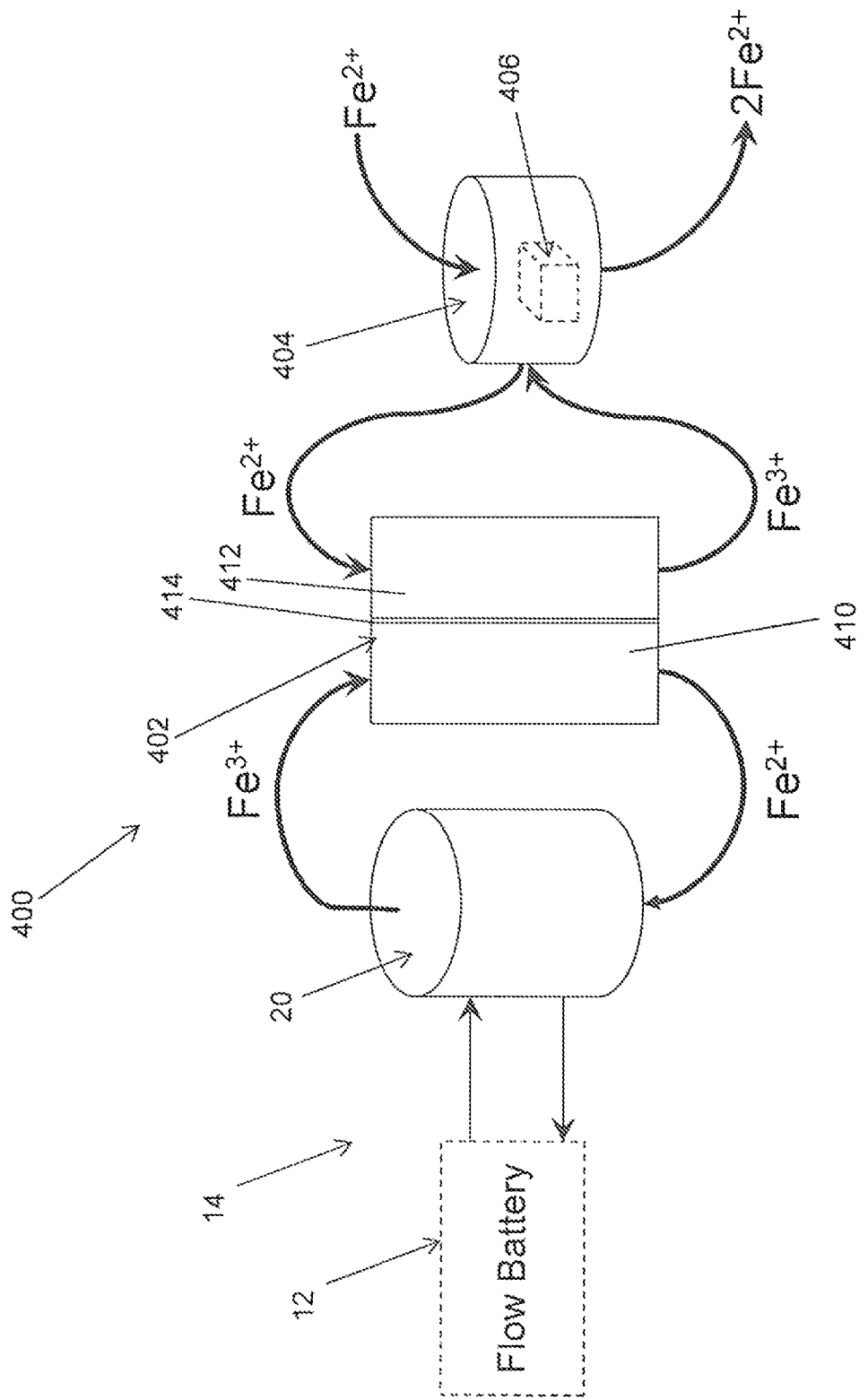
FIG. 5 illustrates a schematic block diagram of two-stage rebalancing system used in a flow battery system according to one embodiment.

FIG. 5 illustrates an embodiment of an electrolyte rebalancing system 10 (FIG. 1), in particular a two-stage rebalance system 400, for use in an Iron/Chrome or other redox flow battery 12 to form a rebalancing flow battery system 14. In some embodiments, the two-stage rebalance system 400 of FIG. 5 may use an electrochemical rebalance cell 402 to reduce an excess electrolyte reactant component (e.g., Fe$^{3+}$) to a desired reactant component (e.g., Fe$^{2+}$) by reacting a mediator reactant solution with the battery electrolyte in the rebalance cell 402. The two-stage rebalance system 400 may also include a mediator electrolyte tank 404 for storing a mediator electrolyte. The two-stage rebalance system 400 may also include a second reaction cell 406 which may be located within or joined in fluid communication with the mediator electrolyte tank 404. The second reaction cell 406 may be configured to restore the reducing ability of the mediator electrolyte. The second reaction cell 406 may take several forms, such as those described in FIG. 4A or FIG. 4B.

In some embodiments, the rebalance cell 402 may be a flow-through electrolytic cell such as that described above with reference to FIG. 2. In alternative embodiments, the rebalance cell 402 may be an in-tank electrolytic cell 200 such as that described above with reference to FIG. 3. In further embodiments, the rebalance cell 402 may comprise any other suitable electrolytic cell design. In most embodiments, at least one of the mediator electrolyte and the battery electrolyte may be pumped or otherwise circulated through the rebalance cell 402. Thus, embodiments of the rebalance cell 402 will be described as a flow-through rebalance cell 402.

In some embodiments, the reaction in the flow-through rebalance cell 402 may be:

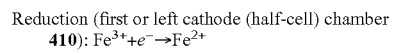

Reduction (first or left cathode (half-cell) chamber 410): Fe$^{3+}$+e$^-$→Fe$^{2+}$     [2]

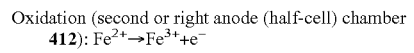

Oxidation (second or right anode (half-cell) chamber 412): Fe$^{2+}$→Fe$^{3+}$+e$^-$     [3]

In some embodiments, a mediator electrolyte tank 404 may be provided as a reservoir for a mediator electrolyte. The mediator electrolyte tank 404 may be fluidically joined to the flow-through rebalance cell 402 such that the mediator electrolyte may be pumped through the flow-through rebalance cell 402. In some embodiments, a mediator electrolyte tank 404 may include features configured to facilitate integration of components for refreshing an active material within the mediator electrolyte. Embodiments of such features and components are described below.

In some embodiments, a mediator electrolyte may include an aqueous solution containing ferrous iron (Fe$^{2+}$). For example in some embodiments, a precursor material containing Fe$^{2+}$ ions, such as FeCl$_2$, may be dissolved in an aqueous supporting electrolyte, such as hydrochloric acid. In alternative embodiments, any other precursor material containing Fe$^{2+}$ ions may be dissolved in any other suitable supporting electrolyte.

As shown in FIG. 5, battery electrolyte from a battery electrolyte tank 20 may be pumped into a left chamber (first half-cell) 410 of the flow-through rebalance cell 402. The mediator electrolyte may be pumped from the mediator electrolyte tank 404 into a right chamber (second half-cell) 412 of the flow-through rebalance cell 402. The chambers 410, 412 of the flow-through rebalance cell 402 may be separated by a microporous separator membrane 414 or by an ion exchange membrane such as DuPont™ NAFION®. Any other suitable flow-through cell construction may alternatively be used.

Within the flow-through rebalance cell 402, a spontaneous electrochemical reaction will proceed in which the Fe$^{3+}$ ions in the left chamber 410 will be reduced to Fe$^{2+}$ as the Fe$^{2+}$ ions in the right chamber 412 are oxidized to Fe$^{3+}$. The electrical terminals of the rebalance cell may be short-circuited, or may be connected to a small load. In some embodiments, the rate of reaction may be controlled by controlling a variable electrical load connected to the terminals.

In some embodiments, the battery electrolyte and the mediator electrolyte may be re-circulated through the flow-through reaction cell 402 of the two-stage rebalance system 400 as many times as needed to achieve a desired level of rebalancing. In alternative embodiments, an electrochemical rebalance stack may be configured with a plurality of cells.

In some embodiments, the Fe$^{3+}$ that is pumped out of the right chamber 412 of the flow-through reaction cell 402 may be reduced back to Fe$^{2+}$ to restore the rebalancing capability of the mediator electrolyte. In some embodiments, such a restorative reaction may be performed as a chemical reaction occurring within the mediator electrolyte tank 404. In some such embodiments, a source of metallic iron (Fe) may be provided directly in the mediator electrolyte tank 404. A spontaneous (with or without catalyst) chemical reaction will proceed within the mediator electrolyte tank 404 in which $Fe^{3+}$ and metallic iron react to produce $3Fe^{2+}$, according to equation [1].

In such embodiments, the concentration of $Fe^{2+}$ in the mediator electrolyte tank 404 may be allowed to increase until it reaches saturation so as to allow the $Fe^{2+}$ to precipitate out of solution (e.g., as $FeCl_2$ salt crystals as described above with reference to FIG. 4B). In some embodiments, precipitation may be encouraged by providing crystal nucleating structures within the mediator electrolyte tank 404 or within a removable module in the mediator electrolyte tank 404. In some embodiments, the $Fe^{2+}$ precipitate may be removed from the mediator electrolyte tank 404 and collected. The collected $Fe^{2+}$ may then be used to produce new electrolyte for external use, such as in building additional Fe/Cr flow batteries. Additionally, when the metallic iron in the mediator electrolyte tank 16 becomes sufficiently consumed, new metallic iron may be added.

In another embodiment, the concentration of $Fe^{2+}$ may be restored to a desired level by replacing a volume of mediator electrolyte having a high concentration of $Fe^{2+}$ with a volume of water or supporting electrolyte (e.g., as described above with reference to FIG. 4A). For example, a controlled quantity of water may be added to the mediator electrolyte tank 404 to restore the relative concentration of $Fe^{2+}$ to a desired value, thus avoiding precipitation. In some embodiments, a volume of mediator electrolyte solution with a high concentration of $Fe^{2+}$ ions may be pumped out of the mediator electrolyte tank 404 and into a separate tank. The collected solution with excess $Fe^{2+}$ may then be transported or processed for external use, such as for manufacturing electrolytes for other Fe/Cr battery units.

Chemical In-Tank Restorative Reaction Cell

Figure 6:
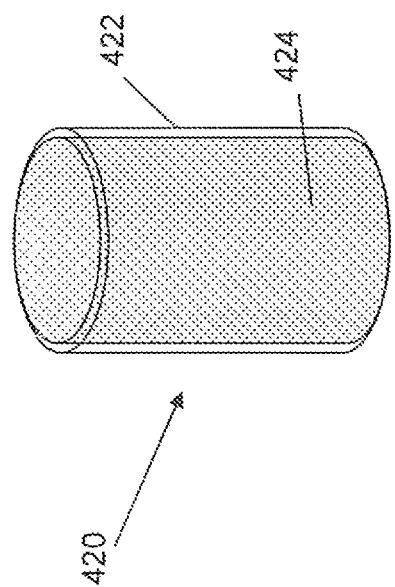
FIG. 6 illustrates a schematic block diagram of a chemical reaction chamber for electrolyte rebalancing in a flow battery system according to one embodiment.

In some embodiments, a second reaction cell 406 (FIG. 5) for restoring the reducing ability of the mediator electrolyte may comprise a chemical reaction chamber 420 such as that illustrated in FIG. 6. In some embodiments, a chemical reaction chamber 420 may be configured for placement within a mediator electrolyte tank 404 (FIG. 5) to cause a restoring reaction in the mediator electrolyte inside the tank. In some embodiments, such a reaction chamber 420 may be placed within the interior of a mediator electrolyte tank 404 along with a circulation device configured to move mediator electrolyte through the reaction chamber 420, or to move the reaction chamber 420 within the tank.

As illustrated in FIG. 6, in some embodiments an in-tank chemical reaction chamber 420 may include a housing portion with an outer wall 422 formed of a porous structure selected to allow free movement of electrolyte into an internal cavity 424 within the outer wall 422. In some embodiments, the housing (outer wall 422) may comprise a tubular cylinder, although any other shape with an internal cavity 424 may also be used. In some embodiments, a permeable chamber may be fabricated from a chemically inert porous material such as graphite or a polymer material that is configured to allow free movement of a liquid electrolyte into and out of the internal cavity 424 such that the electrolyte may freely contact and react with a chemical reducing agent within the cavity 424. In some embodiments, a catalyst may be applied on the porous material such that the catalyst is in contact with both reactants to facilitate the reaction between them.

In some embodiments, a reducing agent, such as metallic iron may be placed within the interior of the internal cavity 424. In some embodiments, once the reducing agent within the internal cavity 424 is consumed, the entire chemical reaction chamber 420 or a removable component within the chemical reaction chamber 420 may be replaced.

Electrolytic Restorative Reaction Cell

In alternative embodiments, a second reaction cell 406 (FIG. 5) for restoring the reducing ability of the mediator electrolyte may be configured as an electrolytic or galvanic flow-through cell of construction similar to the flow-through reaction cell 100 described above with reference to FIG. 2. Such a flow-through electrolytic reaction cell 100 may include a first chamber (first half-cell) 102 and a second chamber (second half-cell) 104 separated by a separator membrane 106. The following embodiments of restorative reactions will be described with reference to the use of a flow-through reaction cell (e.g., flow-through rebalance cell 100 in FIG. 2) as the restorative reaction cell 406 (FIG. 5). In alternative embodiments, the restorative reaction cell may comprise an in-tank electrolytic cell 300 as described above with reference to FIG. 3.

For example, in some embodiments, metallic iron (Fe) may be oxidized to ferrous iron ($Fe^{2+}$) in one chamber (e.g., chamber 102) of a flow-through reaction cell 100 while $Fe^{3+}$ is reduced to $Fe^{2+}$ in the second chamber (e.g., chamber 104). Such embodiments may still proceed according to the reaction of equation [1] above. In some embodiments, such a flow-through reaction cell 100 may also be used to directly rebalance the catholyte of an Fe/Cr flow battery. Because the reaction of equation [1] occurs spontaneously, a flow through cell in which that reaction occurs may be operated as a galvanic cell either by short-circuiting the electrodes, or by electrically connecting the cell to an electric load. In other embodiments, the reaction of equation [1] may be driven as an electrolytic reaction in a flow-through cell. In such embodiments, the reaction may achieve a higher reaction rate, and may allow for additional control.

Rebalancing With Organic Compounds

In some alternative embodiments, a flow battery electrolyte may be rebalanced using an organic reducing agent within a modified in-tank chemical reaction cell such as that described above with reference to FIG. 6. For example, in some embodiments, an organic reducing agent may be placed within a chemical reaction chamber 420, and the reaction chamber 420 may be placed within an electrolyte tank. In some embodiments, an organic reducing agent may be selected to react to form an innocuous gas and/or water as a byproduct. For example, in some embodiments, organic liquids of the general formula $C_xH_yO_z$ that react to form gaseous $CO_2$ are useful. Examples of such compounds may include formic acid (HCOOH), formaldehyde (HCHO), oxalic acid ($C_2H_2O_4$), methanol ($CH_3OH$), etc. Hydrogen is also a reducing agent that forms $H^+$ and may be used to reduce $Fe^{3+}$ to $Fe^{2+}$. The reducing properties of carbon monoxide (CO) may also be used to reduce $Fe^{3+}$ to $Fe^{2+}$. Nitrogen-containing compounds that oxidize to $N_2$ may also be used. $N_2H_4$ may also be used but the reaction product may include ammonium ions ($NH^{4+}$). This cation may not be desirable if its presence results in deleterious effects to the electrode kinetics and electrolyte conductivity.

In such organic reducing agent embodiments, an in-tank chemical cell such as that illustrated in FIG. 6 may be modified such that a catalyzed chemical reaction occurs in a region within a porous outer wall 422 material of the chamber 420 between an organic reducing agent stored within the interior cavity 424 and the electrolyte in the tank. Thus, in some embodiments, the outer wall 422 may be configured to be substantially semi-permeable to allow reactions between the organic liquid compound within the internal cavity and the electrolyte within the tank. In such embodiments, the organic reducing agent may permeate outwards through the outer wall 422 and the electrolyte to be reacted may penetrate inwards. In some embodiments, a catalyst may be provided to promote the desired reaction. Such a catalyst material may be provided within the internal cavity 424, or within a portion of the outer wall 422 between an outer surface and the internal cavity 424. Alternatively, a catalyst may be provided as a coating on the semi permeable membrane of the outer wall 422. In some embodiments, a reaction chamber 420 may be placed within a tank along with a circulation device configured to direct fresh electrolyte over the reaction chamber 420.

Sulphuric Acid Electrolytic Cell

In some embodiments, an electrolytic flow-through rebalance cell 100 such as that shown in FIG. 2 may be configured to directly rebalance a flow battery electrolyte by oxidizing $H_2O$ in the anode (rebalance) chamber 102 and reducing $Fe^{3+}$ to $Fe^{2+}$ in the cathode (battery) chamber 104. In some embodiments, the anode chamber 102 may be configured to have a substantially larger internal volume as compared with the cathode chamber 104. Such a relatively large volume may substantially reduce the current density in the anode (rebalance) chamber 102, thereby reducing the overvoltage for $O_2$ production. A rebalance cell 100 of these embodiments may use a cation exchange membrane in order to minimize migration of $Cl^-$ ions. In some embodiments, the anode (rebalance) chamber 102 may be configured as a static volume, while in other embodiments the rebalance electrolyte may flow through the rebalance cell 100.

In some embodiments, a rebalance reactant may include a solution of $H_2SO_4$ (sulphuric acid), which may be introduced into the anode chamber 102. The flow battery electrolyte to be rebalanced may be introduced into the cathode chamber 104, and an electric current may be applied, thereby operating the rebalance cell 100 in an electrolytic mode. In alternative embodiments, the rebalance reactant may include phosphoric acid, sulfamic acid, fluoroboric acid or any other acid solution that generates only oxygen upon oxidation. In such embodiments, the desired reactions may be as follows:

Anode reaction: $H_2O(a) \rightarrow \frac{1}{2}O_2 + 2H^+(a) + 2e^-$ [4]

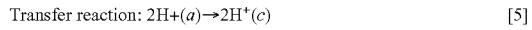
Transfer reaction: $2H+(a) \rightarrow 2H^+(c)$ [5]

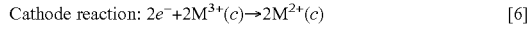
Cathode reaction: $2e^- + 2M^{3+}(c) \rightarrow 2M^{2+}(c)$ [6]

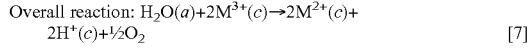
Overall reaction: $H_2O(a) + 2M^{3+}(c) \rightarrow 2M^{2+}(c) + 2H^+(c) + \frac{1}{2}O_2$ [7]

where M is the catholyte (e.g. Fe) or anolyte (e.g. Cr). In such embodiments, the only material consumed is water and the only by-product is oxygen gas. In such embodiments, the oxygen gas may be vented to atmosphere, or captured and stored. In some embodiments, the Fe and Cr complexes may contain chloride. These are cations and may thus pass through a cation exchange membrane, bringing chloride to the anode chamber. As a result, trace amounts of chlorine may be generated in a side reaction of oxygen generation. Thus, in some embodiments, rebalancing processes may be performed on an Fe/Cr flow battery electrolyte without producing substantial quantities of $Cl_2$. The concentration of sulfuric acid, or other suitable acids, is not critical. The desired concentration should be such that the osmotic pressure of the acid equals that of the electrolyte being rebalanced.

In some embodiments, it may be desirable to conduct rebalancing on an electrolyte when the electrolyte is at or near a specified state-of-oxidation concentration. For example, in some embodiments with an Fe/Cr electrolyte chemistry, it may be desirable to conduct catholyte rebalancing processes at a high (i.e. relatively charged) state-of-oxidation, since the higher concentration of $Fe^{3+}$ facilitates the reaction of equation [6]. Similarly, conducting anolyte rebalancing processes at a relatively low (i.e. relatively discharged) state-of-oxidation, with a relatively high concentration of $Cr^{3+}$ may facilitate the reaction of equation [6] and minimize any $H_2$ side reaction.

In some embodiments, the voltage applied to the electrolytic cell may be higher than the OCV of the reaction of equation [7]. The OCV suggested by equation [7] will vary depending on whether the anolyte or catholyte is being rebalanced, as will be clear to the skilled artisan from the following equations.

For rebalancing the negative electrolyte:

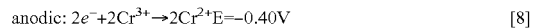
anodic: $2e^- + 2Cr^{3+} \rightarrow 2Cr^{2+} E=-0.40V$ [8]

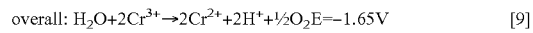
overall: $H_2O + 2Cr^{3+} \rightarrow 2Cr^{2+} + 2H^+ + \frac{1}{2}O_2 E=-1.65V$ [9]

For rebalancing the positive electrolyte:

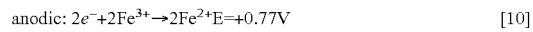
anodic: $2e^- + 2Fe^{3+} \rightarrow 2Fe^{2+} E=+0.77V$ [10]

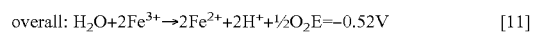
overall: $H_2O + 2Fe^{3+} \rightarrow 2Fe^{2+} + 2H^+ + \frac{1}{2}O_2 E=-0.52V$ [11]

Therefore, in some embodiments a relatively high voltage may be needed to drive the rebalance reaction for rebalancing the negative electrolyte using embodiments of an $H_2O$ reducing system such as those described above.

Carbon Electrolytic Cell

In alternative embodiments, carbon may be oxidized to $CO_2$ in a rebalance cell 100, 200 such as those described above with reference to FIGS. 2 and 3, respectively, with a solid carbon electrode. Such embodiments may proceed according to the following reactions:

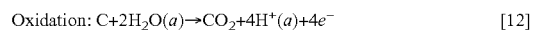
Oxidation: $C + 2H_2O(a) \rightarrow CO_2 + 4H^+(a) + 4e^-$ [12]

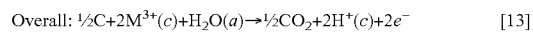
Overall: $\frac{1}{2}C + 2M^{3+}(c) + H_2O(a) \rightarrow \frac{1}{2}CO_2 + 2H^+(c) + 2e^-$ [13]

It is desirable to use carbon of good conductivity and high surface area (e.g., greater than about 50 $m^2/g$). A particular suitable form of carbon is carbon black. A solid electrode may be fabricated with the desired carbon and a binder material. In such carbon-oxidizing embodiments, water is consumed and $CO_2$ is produced as a byproduct.

Unequal Mixed Reactant

In some embodiments, instead of actively rebalancing unbalanced electrolytes, it may be desirable to simply mitigate the disadvantages of an unbalanced system. In some embodiments, a mixed reactant that contains unequal concentrations of $FeCl_2$ and $CrCl_3$ in the initial electrolyte (fully discharged) may be used to minimize the inequality in concentrations of $CrCl_2$ and $FeCl_3$, and to mitigate $H_2$ evolution. One example of the composition in the fully discharged state is 1M $FeCl_2$/1.1M $CrCl_3$/2-3M HCl. In such embodiments, the concentration of $CrCl_3$ is intentionally made higher than that of $FeCl_2$. Upon charge, the SOO of $CrCl_2$ will be lower than that of $FeCl_3$, thereby avoiding high SOO conditions at the Cr electrode where $H_2$ evolution is a greater problem. With this unequal mixed reactant, the Fe electrode may be charged to nearly 100% while the Cr electrode is charged to a lower SOO. The presence of excess $CrCl_3$ allows the Cr electrode to avoid the high SOOs where $H_2$ evolution becomes a problem.

The Fe ionic species ($Fe^{3+}$, $Fe^{2+}$) at the positive electrode have a total concentration $Fe_t = Fe^{3+} + Fe^{2+}$. Correspondingly, the Cr ionic species ($Cr^{3+}$, $Cr^{2+}$) at the negative electrode have a total concentration $Cr_t = Cr^{3+} + Cr^{2+}$. With the unequal mixed reactant, $Fe_t$ does not equal $Cr_t$, and the concentration of ionic species $Fe^{3+}$, $Fe^{2+}$, $Cr^{3+}$ and $Cr^{2+}$ vary widely with SOO which is defined here as $PosSOO=Fe^{3+}/Fe_t$ and $NegSOO=Cr^{2+}/Cr_t$, for the positive electrode and negative electrode, respectively.

The rate of $H_2$ evolution is enhanced at more negative potentials, which occurs as the Cr electrode becomes more fully charged. During charge, the ratio of the concentration of $Cr^{2+}$ to the concentration of $Cr^{3+}$ (i.e. $Cr^{2+}/Cr^{3+}$) increases, which is reflected in the more negative potential of the Cr electrode. By adding excess $Cr^{3+}$, this ratio will be lower and hence, the potential of the Cr electrode will be less negative and $H_2$ evolution will be mitigated.

For example, the maximum charge that may be inputted to a cell with a mixed reactant with unequal concentrations of $FeCl_2$ and $CrCl_3$ at 0% SOO (fully discharged) of 1M $FeCl_2$/1.1M $CrCl_3$/2M HCl is limited by the lower concentration of the electroactive species in the anolyte or catholyte. In this case, the lower concentration is 1M $FeCl_2$. The effect of excess $CrCl_3$ on SOO may be seen in the following example. During charge, if nearly the entire 1M $FeCl_2$ is oxidized to $FeCl_3$, then PosSOO is nearly 100%. At the same time approximately the same amount (1M) of $CrCl_3$ is reduced to $CrCl_2$. The NegSOO is approximately 91% (1.0/1.1). In this example, the maximum SOO of the unequal mixed reactant composition is a function of the excess amount of $CrCl_3$ and the concentration of $FeCl_2$.

The following is an example of the benefits of the unequal mixed reactant on the cell voltage. The cell voltage calculated using a Nernst potential relationship is 1.104 V for a cell containing equimolar mixed reactant (i.e. 1M $FeCl_2$/1M $CrCl_3$/1M HCl) that is charged to 90% SOO.

This may be compared with a cell with an unequal mixed reactant containing an excess of $Cr^{3+}$ with a composition of 1M $FeCl_2$/1.1M $CrCl_3$/1M HCl. When the PosSOO is 90% for the positive electrode (Fe electrode), the negative electrode (Cr electrode) NegSOO is 81.8% and the cell voltage is 1.084 V. By adding a slight excess of $Cr^{3+}$, the SOO of the negative electrode is lower by about 8%. This factor is beneficial for mitigating $H_2$ evolution at higher SOO, and help enhance energy efficiency.

With an unequal mixed reactant containing $[CrCl_3]>[FeCl_2]$, charge is limited by the concentration of FeCl2, and NegSOO<PosSOO. The presence of excess $Cr^{3+}$ reduces the need for rebalancing the anolyte and catholyte concentrations and is beneficial in mitigating $H_2$ evolution at higher SOO.

Embodiments of redox flow battery rebalancing systems, rebalance cells and other systems and methods described herein may be used with any electrochemical reactant combinations that include reactants dissolved in an electrolyte. One example is a stack assembly containing the vanadium reactants V(II)/V(III) or $V^{2+}/V^{3+}$ at the negative electrode (anolyte) and V(IV)/V(V) or $V^{4+}/V^{5+}$ at the positive electrode (catholyte). The anolyte and catholyte reactants in such a system are dissolved in sulfuric acid. This type of battery is often called the all-vanadium battery because both the anolyte and catholyte contain vanadium species. Other combinations of reactants in a flow battery that may utilize the features and advantages of the systems described herein include Sn (anolyte)/Fe (catholyte), Mn (anolyte)/Fe (catholyte), V (anolyte)/Fe (catholyte), V (anolyte)/Ce (catholyte), V (anolyte)/$Br_2$ (catholyte), Fe (anolyte)/$Br_2$ (catholyte), and S (anolyte)/$Br_2$ (catholyte). In each of these example chemistries, the reactants are present as dissolved ionic species in the electrolytes, which permits the advantageous use of configured cascade flow battery cell and stack assembly designs in which cells have different physical, chemical or electrochemical properties along the cascade flow path (e.g. cell size, type of membrane or separator, type and amount of catalyst, etc.). A further example of a workable redox flow battery chemistry and system is provided in U.S. Pat. No. 6,475,661, the entire contents of which are incorporated herein by reference. Many of the embodiments herein may be applied to so-called "hybrid" flow batteries (such as a zinc/bromine battery system) which use only a single flowing electrolyte.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A flow battery system comprising: a first rebalance reaction cell comprising: a first liquid half-cell chamber in fluid communication with a first source of a positive liquid electrolyte, a second liquid half-cell chamber in fluid communication with a second source of a liquid mediator electrolyte comprising dissolved ferrous iron ($Fe^{2+}$) ions, and a separator membrane between the first half-cell chamber and the second half-cell chamber; a second rebalance reaction cell comprising a replenishable source of metallic iron and in fluid communication with the second source of liquid mediator electrolyte; and a flow battery reaction cell coupled to the first rebalance reaction cell, the flow battery reaction cell comprising: a first liquid filled half-cell chamber of the flow battery reaction cell in fluid communication with the first source of positive liquid electrolyte and the first liquid filled half-cell chamber of the first rebalance reaction cell; and a second liquid filled half-cell chamber of the flow battery reaction cell in fluid communication with a source of negative liquid electrolyte, wherein the source of negative electrolyte is separate from the second source of liquid mediator electrolyte and the second rebalance reaction cell.

2. The flow battery system of claim 1, wherein the second rebalance reaction cell is a galvanic cell in which the mediator electrolyte is separated from the replenishable source of metallic iron by a separator membrane.

3. The flow battery system of claim 1, wherein the second rebalance reaction cell is an electrolytic cell in which the liquid mediator electrolyte is separated from the replenishable source of metallic iron by a separator membrane.

4. The flow battery system of claim 1, wherein the second rebalance reaction cell is a chemical reactor in which the liquid mediator electrolyte is in direct contact with the replenishable source of metallic iron.

5. The flow battery system of claim 1, wherein the first rebalance reaction cell or the second rebalance reaction cell comprises a catalyst.

6. The flow battery system of claim 1, wherein the positive liquid electrolyte comprises an excess of ferric iron ($Fe^{3+}$) ions.

7. The flow battery system of claim 1, wherein at least one of the first rebalance reaction cell and the second rebalance reaction cell is configured as a flow-through reaction cell.

8. The system of claim 4, wherein the source of mediator electrolyte comprises a reservoir.

9. The system of claim 4, wherein the second rebalance reaction cell is located inside of the reservoir.

10. The system of claim 4, wherein the second rebalance reaction cell is located outside of the reservoir.

* * * * *